United States Patent
Sandman et al.

(10) Patent No.: US 9,551,505 B2
(45) Date of Patent: Jan. 24, 2017

(54) DAMPER ACCESS ASSEMBLY, CLAMP ASSEMBLY, AND CLAMP MEMBER

(71) Applicant: LANGDON INCORPORATED, Cincinnati, OH (US)

(72) Inventors: Joseph P. Sandman, Morrow, OH (US); Michael N. Sandman, Morrow, OH (US)

(73) Assignee: Langdon Incorporated, Cincinnati, OH (US)

( * ) Notice: Subject to any disclaimer, the term of this patent is extended or adjusted under 35 U.S.C. 154(b) by 1083 days.

(21) Appl. No.: 13/708,287

(22) Filed: Dec. 7, 2012

(65) Prior Publication Data

US 2013/0324029 A1    Dec. 5, 2013

Related U.S. Application Data

(63) Continuation-in-part of application No. 13/488,881, filed on Jun. 5, 2012, now Pat. No. 9,341,291.

(51) Int. Cl.
  *F24F 13/10* (2006.01)
  *F24F 13/02* (2006.01)

(52) U.S. Cl.
  CPC .......... *F24F 13/0209* (2013.01); *F24F 13/10* (2013.01)

(58) Field of Classification Search
  CPC .............................. F24F 13/0209; F24F 13/10
  USPC ..... 454/333; 285/252, 253, 242; 292/256.69
  See application file for complete search history.

(56) References Cited

U.S. PATENT DOCUMENTS

| | | | | |
|---|---|---|---|---|
| 455,967 | A | * | 7/1891 | Lusk et al. .............. F16L 33/12  24/271 |
| 620,623 | A | * | 3/1899 | Weissenthanner ..... B65D 45/32  215/275 |
| 1,681,150 | A | * | 8/1928 | Vischer, Jr. ......... A47J 27/0813  220/240 |
| 1,711,115 | A | * | 4/1929 | Johnson .............. A47J 41/0072  206/545 |

(Continued)

OTHER PUBLICATIONS

U.S. Patent and Trademark Office, Office Action in U.S. Appl. No. 13/488,881, dated Apr. 30, 2015.

(Continued)

*Primary Examiner* — Gregory Huson
*Assistant Examiner* — Martha Becton
(74) *Attorney, Agent, or Firm* — Wood Herron & Evans LLP

(57) ABSTRACT

A clamp assembly is provided for use in a duct system. The clamp assembly includes a clamp member including a base portion and first and second lateral portions. The first and second lateral portions extend less than the full circumferential length of the base portion. The clamp assembly may include a first member, a second member, and a hinge operatively coupling the first member to the second member. A damper access assembly includes an adapter, a damper access duct section, and an annular clamp member. A first flange of the adapter and a second flange of the duct section are configured to form a generally T-shaped joint between the adapter and the damper access duct section. The clamp member is configured to removably secure the adapter to the damper access duct section. The damper access duct section is configured to be removable relative to the damper enclosure and the ductwork.

24 Claims, 23 Drawing Sheets

(56) References Cited

U.S. PATENT DOCUMENTS

| | | | | |
|---|---|---|---|---|
| 1,784,516 | A * | 12/1930 | Fairbanks | A47J 47/14 220/320 |
| D135,112 | S | 2/1943 | Jamison et al. | |
| 2,354,045 | A * | 7/1944 | Nystrom | B61D 17/20 105/15 |
| 2,421,533 | A * | 6/1947 | Akerman | B64D 10/00 285/252 |
| 2,579,975 | A * | 12/1951 | Scott | B65D 45/345 24/270 |
| 2,707,123 | A * | 4/1955 | Shults | B65D 45/345 292/256.69 |
| 2,750,064 | A * | 6/1956 | Clarke | A47J 41/0005 206/459.1 |
| 2,775,806 | A | 1/1957 | Love | |
| 3,028,993 | A * | 4/1962 | Muhlhoff | B65D 45/345 220/321 |
| 3,116,078 | A * | 12/1963 | Scherer | F16L 17/04 285/104 |
| 3,248,018 | A * | 4/1966 | Fleischman | B65G 69/181 222/196 |
| 3,261,632 | A * | 7/1966 | Schaefer | B65D 45/345 24/68 D |
| 3,470,589 | A * | 10/1969 | Bauman | B65D 45/345 24/23 R |
| 3,782,411 | A | 1/1974 | Turner | |
| 3,791,681 | A * | 2/1974 | Moldow | F24F 13/0209 285/233 |
| 3,964,774 | A * | 6/1976 | Wollin | F16L 23/06 24/270 |
| 3,986,740 | A * | 10/1976 | Kerr | F16L 45/00 292/256.69 |
| 4,184,288 | A | 1/1980 | Magill et al. | |
| 4,377,245 | A * | 3/1983 | Patty | B65D 43/18 215/274 |
| 4,413,850 | A * | 11/1983 | Siblik | B65D 45/345 292/256.69 |
| D275,059 | S | 8/1984 | Hoeffler | |
| 4,466,641 | A * | 8/1984 | Heilman | F24F 13/0209 285/364 |
| 4,537,430 | A * | 8/1985 | Sullivan | F16L 23/14 285/364 |
| 4,558,892 | A * | 12/1985 | Daw | F16L 23/14 285/331 |
| 4,662,661 | A * | 5/1987 | Arnoldt | F24F 13/0209 285/363 |
| 4,885,122 | A | 12/1989 | Stapleton | |
| 5,095,942 | A | 3/1992 | Murphy | |
| 5,219,088 | A | 6/1993 | Reina et al. | |
| 5,277,458 | A | 1/1994 | Tschann | |
| 5,653,482 | A * | 8/1997 | Ficchi, Jr. | F16L 23/14 285/363 |
| 5,673,947 | A * | 10/1997 | De Waal | F16L 23/14 285/364 |
| 5,829,106 | A | 11/1998 | Dams et al. | |
| D408,178 | S | 4/1999 | Schwartz et al. | |
| 5,909,904 | A | 6/1999 | Shea | |
| D424,566 | S | 5/2000 | Baker | |
| 6,142,536 | A * | 11/2000 | Wolfsdorf | F16L 17/032 285/112 |
| 6,405,411 | B1 | 6/2002 | Allemann et al. | |
| D521,147 | S | 5/2006 | Sandman et al. | |
| D529,598 | S | 10/2006 | Sandman et al. | |
| D534,253 | S | 12/2006 | Sandman et al. | |
| D580,748 | S | 11/2008 | Polak et al. | |
| 7,523,964 | B2 | 4/2009 | Sandman et al. | |
| 7,868,845 | B2 | 1/2011 | Gratton et al. | |
| 7,997,112 | B2 | 8/2011 | Sandman et al. | |
| D647,394 | S | 10/2011 | Taylor | |
| D650,889 | S | 12/2011 | van Walraven | |
| D654,785 | S | 2/2012 | Clorley | |
| 8,267,556 | B2 | 9/2012 | Liu | |
| D703,032 | S | 4/2014 | Bigdeliazari | |
| D703,033 | S | 4/2014 | Karlsson | |
| D723,362 | S | 3/2015 | Bacon | |
| 2002/0074277 | A1 | 6/2002 | Thomassen | |
| 2005/0184524 | A1 | 8/2005 | Stravitz | |
| 2006/0097524 | A1 | 5/2006 | Stolzman | |
| 2006/0220395 | A1 | 10/2006 | Kuzelka | |
| 2009/0083962 | A1 | 4/2009 | Sandman et al. | |
| 2009/0224538 | A1 * | 9/2009 | Fischer | F16L 23/14 285/364 |
| 2009/0266903 | A1 | 10/2009 | Fitzgerald et al. | |
| 2009/0294449 | A1 | 12/2009 | Taylor | |
| 2010/0038902 | A1 | 2/2010 | Sandman et al. | |
| 2010/0187817 | A1 * | 7/2010 | Martin | F24F 13/0209 285/412 |

OTHER PUBLICATIONS

SMACNA Fire Damper Guide, Fifth Edition, Sep. 2002, Chapter 5, Fire Damper Installation, pp. 5.1-5.13; Chapter 7, Damper Types, pp. 7.1-7.6; and Chapter 8, Access Doors and Fire Doors, pp. 8.1-8.3.

* cited by examiner

DAMPER ACCESS ASSEMBLY, CLAMP ASSEMBLY, AND CLAMP MEMBER

CROSS-REFERENCE TO RELATED APPLICATION

This application is a continuation-in-part application of U.S. patent application Ser. No. 13/488,881, filed Jun. 5, 2012, and entitled "DAMPER ACCESS ASSEMBLY," the disclosure of which is hereby incorporated by reference herein in its entirety. This application is related to U.S. Design application Ser. No. 29/439,187 and U.S. Design application Ser. No. 29/439,188, each filed on even date herewith, and each disclosure of which is hereby incorporated by reference herein in its entirety.

FIELD OF THE INVENTION

The present invention relates generally to ventilation duct systems and, more particularly, to access assemblies, clamp assemblies, and clamp members for use in a ventilation duct system to provide access to a damper.

BACKGROUND OF THE INVENTION

In ventilation duct systems, there are oftentimes a variety of components connected to the duct system that must be periodically inspected, maintained, and repaired, as necessary. Due to their internal construction, however, these components are typically not easily accessible for routine inspection, maintenance, and repair.

One such internal device is a damper. As is known, a damper includes one or more movable plates, blades, or curtains that control the flow of a fluid, usually air, in the duct system. Like many mechanical devices, dampers require preventive maintenance and, in the event of operational failure, replacement or repair. As one particular example, fire dampers are safety devices that are often found in walls or floors of a building and are designed to prevent the rapid spread of flames and hot gases through the building via the ventilation duct system. Fire dampers include a fusible link that, when exposed to excessive heat, causes the damper to abruptly close. The action closes the duct system so that it does not provide an avenue for the spread of fire through the building.

Because some dampers, such as fire dampers, are safety devices, they must be protected from collateral damage to the ductwork so that they maintain their operational effectiveness in the event of an emergency. For example, because fire dampers are designed to prevent the spread of fire through the ductwork in a building, the ductwork operatively coupled to the damper is designed to break away without damage to the damper itself. In this manner, should part of the building collapse adjacent the damper and dislodge or destroy the ductwork leading up to the damper, the ductwork may cleanly separate from the damper so that the integrity of the damper is maintained. Thus, structural failures that are typically associated with a fire may not defeat the purpose of the damper and thereby cause catastrophic or rampant spread of fire through the ductwork.

Normally, access to the fire damper and the link are provided by a small access door in the duct that is located in proximity to the damper. However, these doors, due to their location and orientation on the ductwork and/or proximity to other components of the duct system or other structures in the building, often provide only limited visibility of the fire damper and link and thus make inspection, maintenance, and repair awkward and difficult. In addition, replacement of the damper and/or the link is often not possible via the access door so that their replacement is a time-consuming and expensive endeavor. Often, replacement in this situation may essentially require dismantling of a large portion of the duct system simply to gain physical access to the fire damper.

Thus, there is a need for improved access to dampers that overcome these and other shortcomings and drawbacks of known access doors in ventilation duct systems.

SUMMARY OF THE INVENTION

The present invention overcomes the foregoing and other shortcomings and drawbacks of access doors heretofore known for use in ventilation duct systems. While the invention will be described in connection with certain embodiments, it will be understood that the invention is not limited to these embodiments. On the contrary, the invention includes all alternatives, modifications and equivalents as may be included within the spirit and scope of the present invention.

In accordance with the principles of the present invention, a clamp assembly is provided for use in a ventilation duct system for joining a first outwardly directed flange of a first duct with a second outwardly directed flange of a second duct. The outwardly directed flanges are configured to confront one another and define a gap therebetween.

According to one aspect of the present invention, the clamp assembly includes an annular clamp member including a base portion that defines an annular periphery of the clamp member. A first lateral portion and a second lateral portion each extend from the base portion. The first lateral portion confronts the second lateral portion to define a channel therebetween for receiving the first and second flanges. The first lateral portion and second lateral portion extend less than the full circumferential length of the base portion.

According to one aspect of the present invention, the first lateral portion of the clamp assembly includes a plurality of circumferentially spaced-apart first lateral portions and the second lateral portion includes a plurality of circumferentially spaced-apart second lateral portions.

According to another aspect of the present invention, each of the first outwardly directed flange and the second outwardly directed flange includes a leg extending transversely therefrom. The transverse legs are configured to form a generally T-shaped joint when the first flange confronts the second flange. The channel of the annular member is configured to receive the T-shaped joint therein.

According to another aspect of the present invention, the clamp assembly further includes at least one faceplate configured to be secured to one of the first duct section or the second duct section. The faceplate includes a first leg configured to be secured to the duct section and a second leg. The clamp member is configured to receive the second leg therein.

According to another aspect of the present invention there is a clamp assembly for joining a first outwardly directed flange of a first duct with a second outwardly directed flange of a second duct. The flanges are configured to confront one another and define a gap therebetween. The assembly includes a first member, a second member, and a hinge operatively coupling the first clamp member to the second clamp member to form at least a portion of an annular clamp member. The first member is moveable relative to the second member by the hinge between an opened position in which the clamp member is installable onto the first and second ducts and a closed position in which the assembly engages each of the first and second flanges. Each of the first and second members includes a base portion and a first lateral portion and a second lateral portion each extending from the base portion. The first lateral portion confronts the second lateral portion to define a channel therebetween for receiving the first and second flanges.

According to another aspect of the present invention there is a damper access assembly for use in a ventilation duct system. The ventilation duct system includes ductwork and a damper enclosure configured to enclose a damper and having an inlet and an outlet operatively coupled to the ductwork. The damper access assembly includes an adapter, a damper access duct section, and an annular clamp member. The adapter defines a passage therethrough and has a first end and a second end. The first end is configured to be operatively coupled to one of the inlet or outlet of the damper enclosure, and the second end includes a first radially outwardly directed flange including a leg extending at a transverse angle therefrom.

The damper access duct section defines a passage therethrough and has a first end and a second end. Each of the first end and the second end of the damper access duct section includes a second radially outwardly directed flange at the respective first end and second end thereof. Each of the second flanges include a leg extending at a transverse angle therefrom. The first flange of the adapter and one of the second flanges of the duct section are configured to form a generally T-shaped joint between the adapter and the damper access duct section.

The annular clamp member includes a base portion that defines an annular periphery of the clamp member and a first lateral portion and a second lateral portion that each extend from the base portion. The first lateral portion and the second lateral portion extend less than the full circumferential length of the base portion. The first lateral portion confronts the second lateral portion to define a channel therebetween for receiving the generally T-shaped joint to releasably couple the damper access duct section to the adapter.

The first flange of the adapter is configured to be operatively and releasably coupled to one of the second flanges of the damper access duct section at one of the first or second ends thereof. The other second flange at the other of the first or second end of the damper access duct section is configured to be operatively and releasably coupled to the ductwork so that the damper access duct section is removable relative to the damper enclosure and the ductwork to permit access to the damper when the damper access duct section is removed.

According to another aspect of the present invention, there is an annular clamp member including a first member, a second member, and a hinge operatively coupling the first member to the second member. The first member is moveable relative to the second member by the hinge between an opened position in which the clamp member is installable onto the first and second flanges and a closed position in which the annular clamp member engages each of the first and second flanges to releasably couple the access duct section to the adapter. Each of the first and second members includes a base portion defining an annular periphery of the clamp member and includes a first lateral portion and a second lateral portion each extending from the base portion. The first lateral portion confronts the second lateral portion to define a channel therebetween for receiving the generally T-shaped joint. The damper access duct section is configured to be operatively and releasably coupled to the ductwork with the annular clamp member so that the damper access duct section is removable relative to the damper enclosure and the ductwork to permit access to the damper when the damper access duct section is removed.

The above and other objectives and advantages of the present invention shall be made apparent from the accompanying drawings and the description thereof.

BRIEF DESCRIPTION OF THE DRAWINGS

The accompanying drawings, which are incorporated in and constitute a part of this specification, illustrate an embodiment of the invention and, together with the general description of the invention given above and the detailed description of embodiments given below, serve to explain the principles of the present invention.

DETAILED DESCRIPTION OF THE INVENTION

Figure 1:
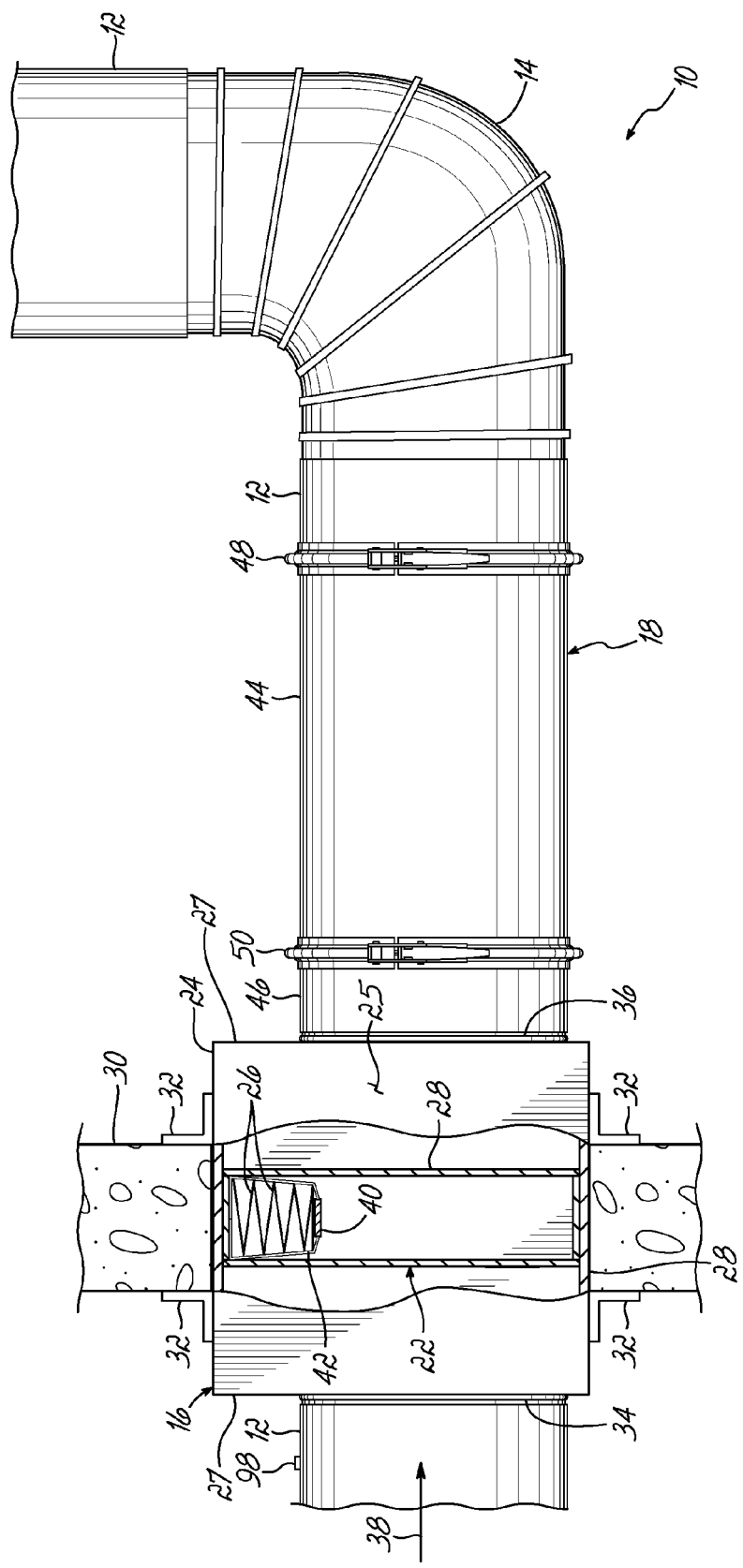
FIG. 1 is a partial cross-sectional side elevational view of an exemplary ventilation duct system according to one embodiment of the present invention.

Referring now to the figures, and to FIG. 1 in particular, an exemplary ventilation duct system 10 is shown in accordance with the principles of the present invention. The duct system 10 may include ductwork of various types of duct components, such as, multiple ventilation duct runs 12 and an elbow 14. The duct system 10 further includes a damper assembly 16 and a damper access assembly 18, each described in more detail below, which are interconnected at joints to form the duct system 10. The duct system 10 may be configured to direct the flow of a fluid, for example, air, to various parts of a building.

For example, the duct system 10 may form one branch of a heating, ventilation, and air conditioning (HVAC) system in a building. While the exemplary ventilation duct system 10 is shown including specific ductwork, it will be appreciated that other types and configurations of ductwork are also known to those of ordinary skill in the art and are also possible without departing from the spirit and scope of the present invention. For example, although not shown, the ductwork may include one or more sleeve couplings to couple adjacent ducts 12 together as well as one or more duct reducers to couple ducts of different cross-sectional dimensions together.

As will be described in greater detail below, all or a portion of the damper access assembly 18 may be easily removed from the duct system 10 thereby permitting visual and/or physical access to internal components of the duct system 10. For example, the damper access assembly 18 may allow access to the internal components of the damper assembly 16 that are not generally assessable through an access door (not shown).

To that end, and with continued reference to FIG. 1, the damper assembly 16 may include a damper 22 secured within an enclosure 24. Further, the damper 22 may include a plurality of blades 26 mounted within a frame 28. The blades 26 may be oriented or controlled to regulate the flow of fluid through the damper assembly 16. The frame 28 may be secured to the enclosure 24. The enclosure 24 may include one or more sidewalls 25 and opposing end walls 27 extending transversely from the sidewall 25. When installed, the enclosure 24 may be secured to the structure of the building, such as to a wall 30, by retaining angles 32 between the sidewall 25 and the wall 30 so as to align the damper 22 with the wall 30, as shown. However, embodiments of the present invention are not limited to the relative orientation or position of the damper 22 relative to the building structure. For example, the damper 22 may be offset from the wall 30. This may be the case for smoke dampers which may be installed at or adjacent to the point where the duct passes through a smoke barrier (not shown).

The damper assembly 16 may include an inlet 34 and an outlet 36 operatively coupled to the ductwork. In the exemplary embodiment shown in FIG. 1, the inlet 34 and the outlet 36 are each defined by the endwalls 27. With this construction, the damper assembly 16 may operate to throttle or regulate a flow of a fluid (indicated by arrow 38) between the inlet 34 and the outlet 36. By way of example only, the fluid may be air or other gases. Embodiments of the present invention are not, however, limited to any specific fluid. While the inlet 34 and the outlet 36 are shown and described in a particular orientation shown in FIG. 1, this orientation is merely exemplary. It will be appreciated that the inlet 34 and the outlet 36 may be reversed from that shown. Furthermore, the flow of fluid through the damper assembly 16 may be reversed during use of the duct system 10. As such, embodiments of the present invention are not limited to the specific direction of the flow of fluid as indicated in FIG. 1.

In this exemplary configuration, removal of all or a portion of the damper access assembly 18 may permit a technician to visually inspect, maintain, and repair components found in the enclosure 24, such as the damper 22. In this regard, the damper 22 may be any one type of a variety of types of dampers including, by way of example only, a fire damper, a balancing damper, a control damper, a fire smoke damper, a backdraft damper, or a smoke damper, to name only a few. As such, the damper assembly 16 may further include additional components. For example, when the damper 22 is a fire damper, and with reference to FIG. 1, the damper assembly 16 may further include a fusible link 40 and a strap 42. As is known, exposing the fusible link 40 to sufficient heat will cause the strap 42 to release the blades 26. Gravity or a spring extends the blades 26 across the frame 28 to close off the inlet 34 from the outlet 36 to prevent or at least inhibit the spread of a fire through the wall 30. Though not shown, dampers may further include springs, guide tracks, and other components depending on the type and function of the damper. Advantageously, removal of a portion of the damper access assembly 18 then provides an avenue for inspection, maintenance, and/or repair of various components located internal to the damper assembly 16.

Furthermore, while the damper assembly 16 is shown to include a vertically oriented damper, it will be appreciated that embodiments of the present invention are not limited to ventilation duct systems having vertically oriented dampers. In this regard, horizontal style dampers are known and are often used in floors or in other locations that require a horizontal orientation. Embodiments of the present invention allow inspection, maintenance, and repair of horizontal dampers and other components that are internally located in the duct system 10.

As described above, and with reference to FIGS. 1-3, the damper access assembly 18 allows a technician to easily access these and other internal components. To that end, and in one embodiment, the damper access assembly 18 includes a damper access duct section 44 and an adapter 46. In the installed position, as shown in FIGS. 1 and 2, the damper access assembly 18 may be operatively coupled to the damper assembly 16 at one end thereof and to the duct 12 at the other end thereof.

In particular, in the embodiment shown, one end of the damper access duct section 44 is operatively coupled to the duct 12, and the adapter 46 is operatively coupled to the damper assembly 16 at the outlet 36 of the damper enclosure 24. As shown, the damper access duct section 44 may be coupled to the duct 12 with a clamp 48 at one end thereof and may be coupled to the adapter 46 with a clamp 50 at the other end thereof. As is described in more detail below, the damper access duct section 44 may be disconnected from the duct system 10 by removing clamps 48 and 50 to allow the damper access duct section 44 to be removed relative to the damper enclosure 24 and the ductwork, such as, the duct 12, to permit access to internal components found in the duct 12 and/or the damper assembly 16, such as the damper 22.

Figure 2:
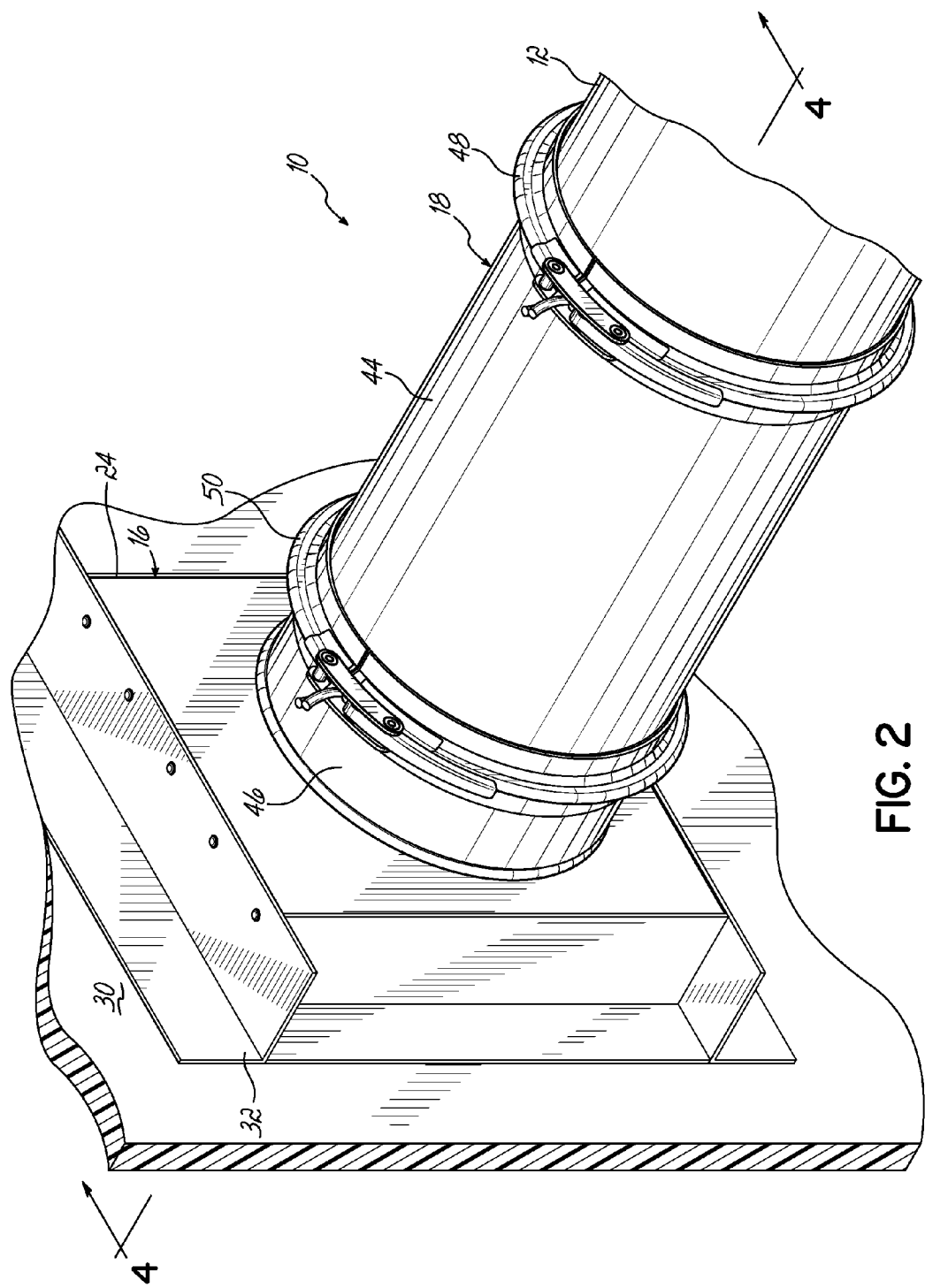
FIG. 2 is a perspective view of a portion of the ventilation duct system of FIG. 1 according to one embodiment of the present invention.
Figure 3:
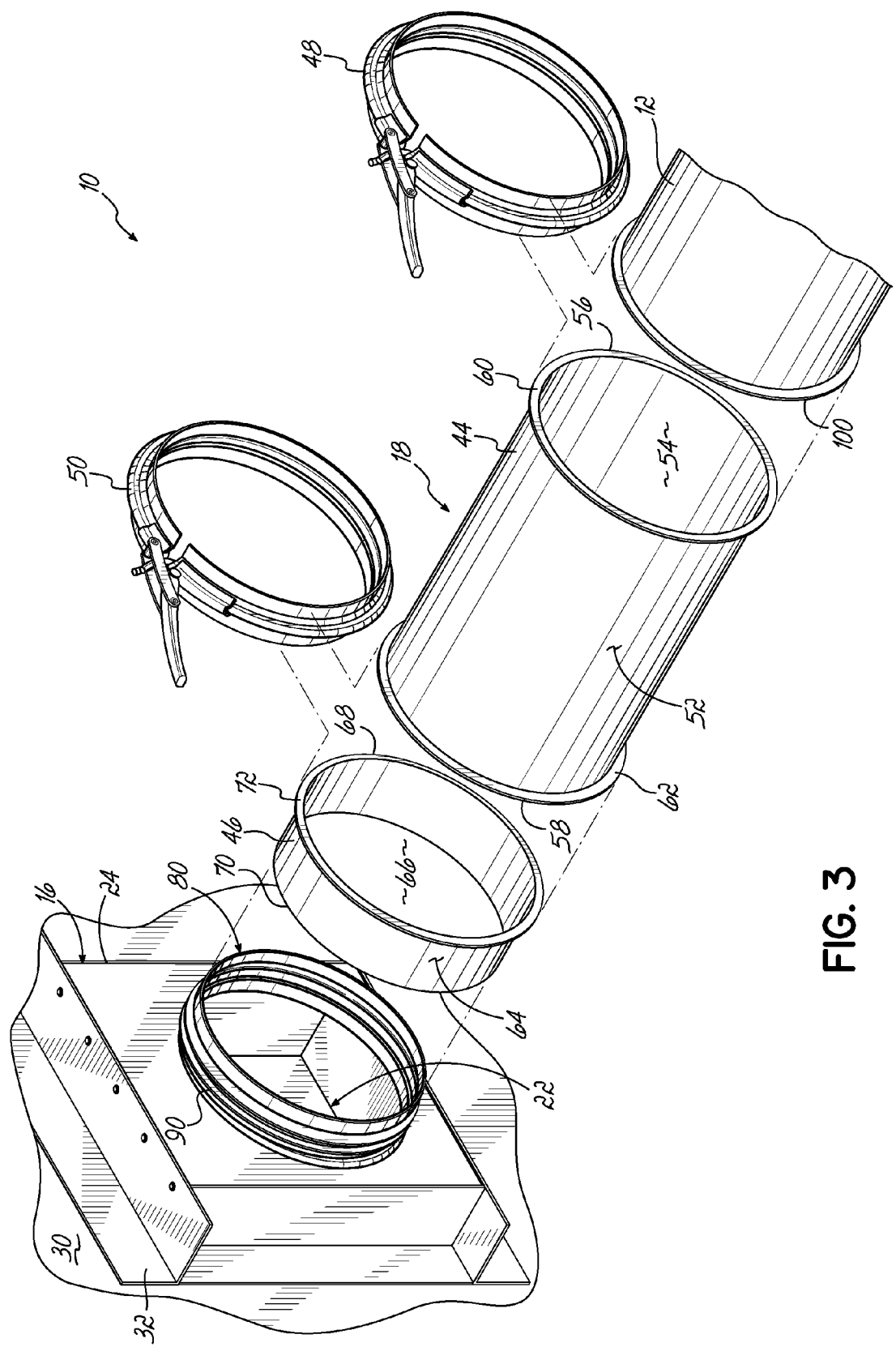
FIG. 3 is an exploded perspective view of the embodiment shown in FIG. 2.
Figure 4:
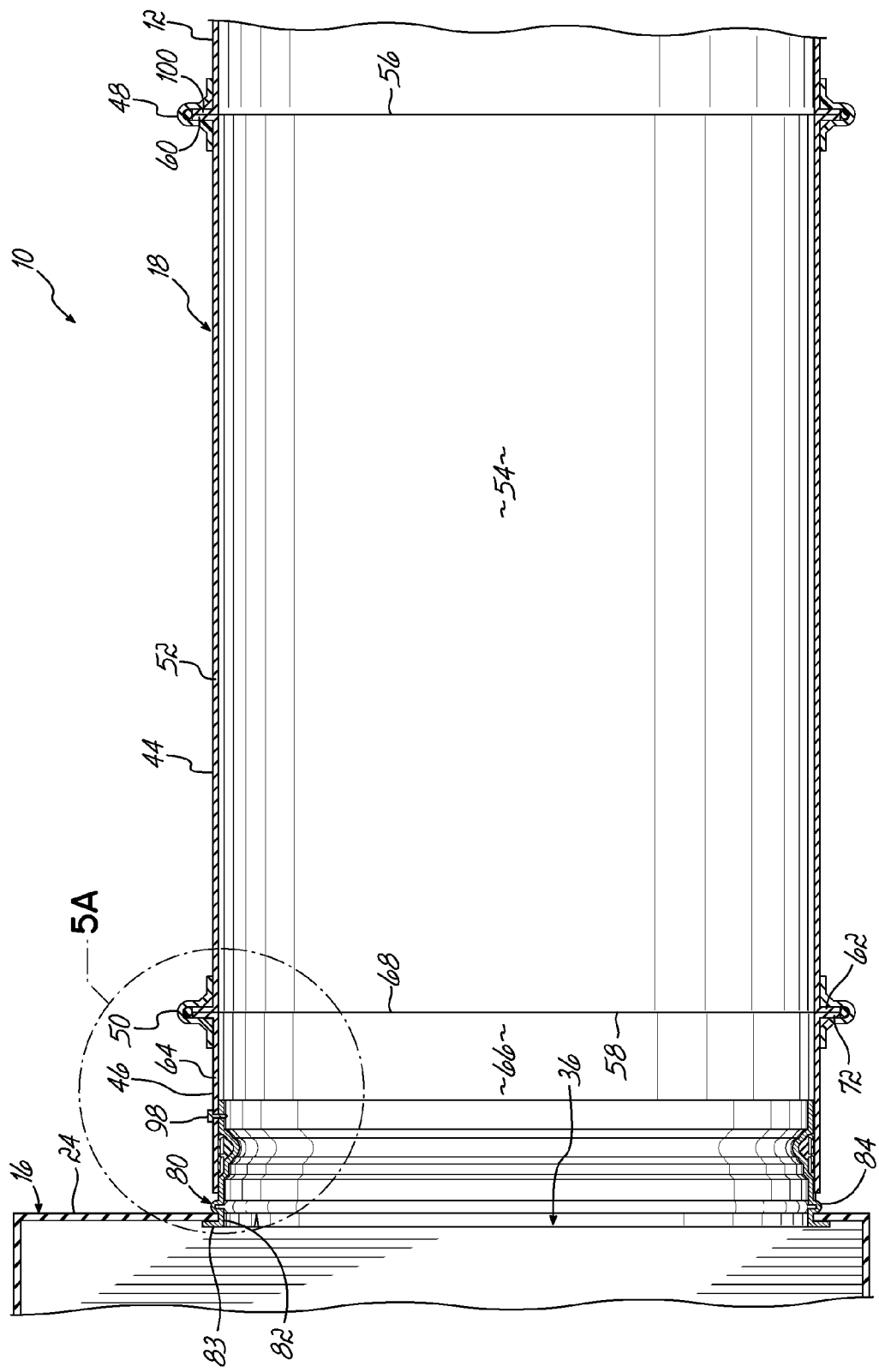
FIG. 4 is a cross-sectional view of the embodiment shown in FIG. 2 taken along section line 4-4.

With reference to FIGS. 2, 3, and 4, in which like reference numerals refer to like features, the damper access duct section 44 has a sidewall 52 that defines a passage 54 along an internal surface thereof. In the embodiment shown, the damper access duct section 44 has a tubular configuration and may have a cylindrical shape. It will be appreciated, however, that the damper access duct section 44 is not limited to cylindrical shapes as other cross-sectional shapes are contemplated, for example, rectangular, square, or oval cross-sectional shapes. The passage 54 may be in direct contact with the fluid flow from the damper assembly 16. However, the damper access duct section 44 may include a liner (not shown), such as, internal insulation, along the internal surface of the sidewall 52 so that the passage 54 is defined by the liner. Similarly, the external surface of the sidewall 52 may be covered by an external liner (not shown), such as, external insulation.

The sidewall 52 has ends 56 and 58 each having a respective radially outwardly directed flange 60, 62. In one embodiment, one or both of the radially outwardly directed flanges 60, 62 are integrally formed with the sidewall 52. Integrally forming the flanges 60, 62 may be achieved by one or more of the methods disclosed in U.S. Pat. No. 7,997,112; U.S. Publication No. 2009/0083962; and U.S. Publication No. 2010/0038902, which are assigned to the assignee of the present invention and are incorporated by reference herein in their entireties. Alternatively, the flanges 60, 62 may be formed with a van stone machine, by way of example, or any other conventional method.

As described above, the adapter 46 is operatively coupled to the damper access duct section 44 and the damper assembly 16. In that regard, the adapter 46 includes a sidewall 64 that defines a passage 66. The sidewall 64 has ends 68 and 70. At least one of the ends 68 and 70 has a radially outwardly directed flange 72. In one embodiment, the flange 72 may be formed by one of the methods disclosed above with regard to forming one or both of the flanges 60, 62. In the embodiment shown, the damper access duct section 44 has a tubular configuration and may have a cylindrical shape. However, like the damper access duct section 44 described above, it will be appreciated, that the adapter 46 is not limited to cylindrical shapes as other cross-sectional shapes are contemplated, for example, rectangular, square, or oval cross-sectional shapes. Further, embodiments of the invention are not limited to the adapter 46 and the damper access duct section 44 having the same shape, as is described in detail below.

More specifically, as shown in FIGS. 3 and 4, at the joint between the damper access duct section 44 and the adapter 46, the adapter 46 via the flange 72 may be operatively coupled to the damper access duct section 44 via the flange 62. For example, the clamp 50 may engage each of the flanges 62 and 72 to force them toward one another so as to removably secure the damper access duct section 44 to the adapter 46.

Figure 5A:
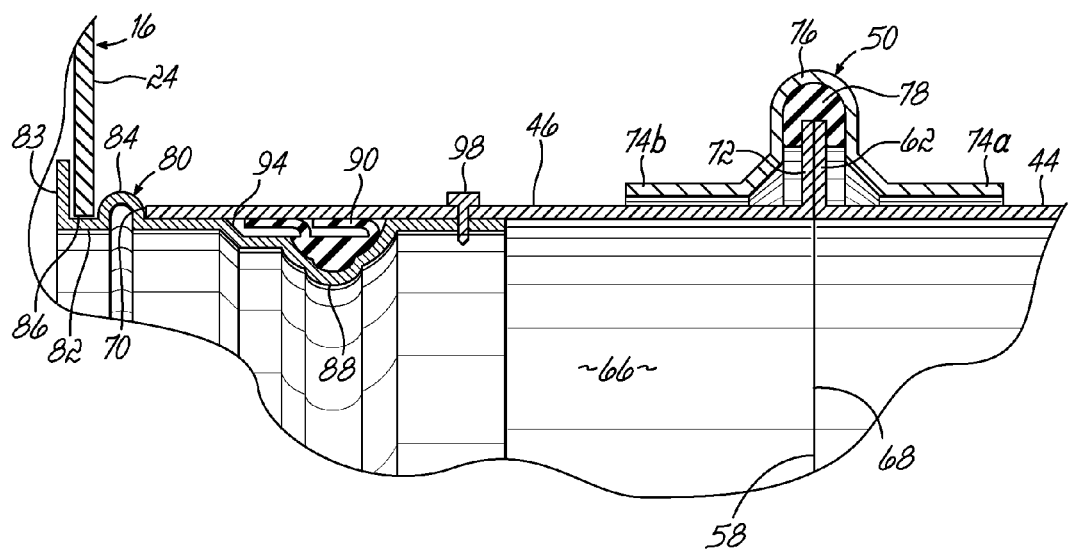
FIG. 5A is an enlarged view of the encircled area 5A of FIG. 4 illustrating one embodiment of a joint.

In one embodiment, and with reference to FIG. 5A, the flanges 62 and 72 may align with one another in a direct abutting relationship. That is, when the damper access assembly 18 is in an installed position, an outwardly facing surface of the flange 62 and an outwardly facing surface of the flange 72 may be in contact with the one another. The clamp 50 may be disposed over the flanges 62 and 72 so as to operatively couple the damper access duct section 44 and the adapter 46 and prevent unintentional separation thereof.

In this regard, the clamp 50 may include clamp legs 74*a*, 74*b* and a loop portion 76 formed between and joining clamp legs 74*a*, 74*b*. The clamp 50 may also include a gasket member 78 positioned proximate the loop portion 76. The gasket member 78 may span across the interface between the flange 62 and the flange 72 so as to inhibit or prevent travel of fluid through any gap that may exist between the flange 62 and the flange 72 thereby forming a fluid-tight seal between the damper access duct section 44 and the adapter 46.

Figure 5B:
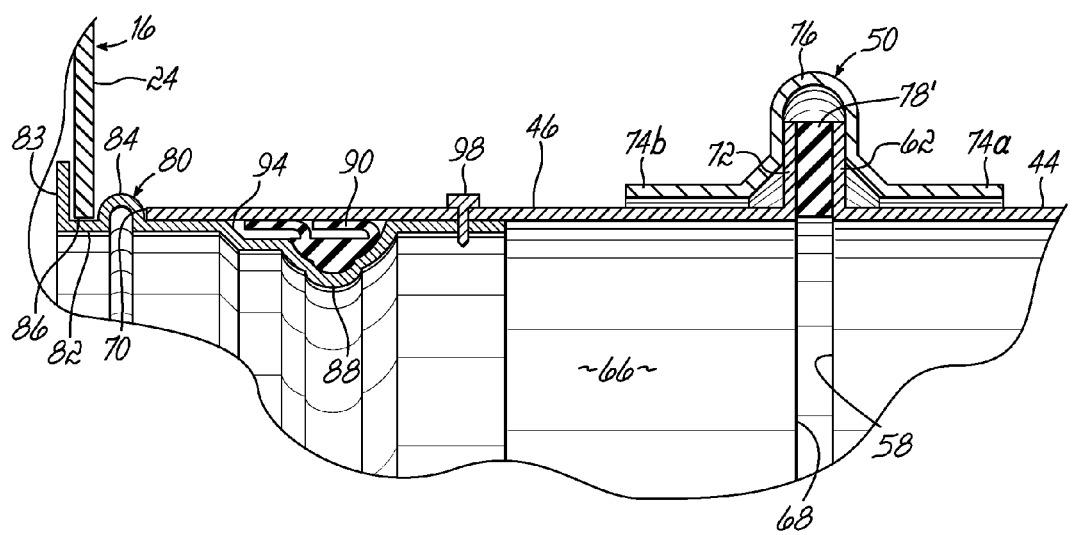
FIG. 5B is an enlarged view of the encircled area 5A of FIG. 4 illustrating an alternative embodiment of the joint to that shown in FIG. 5A.

In an alternative embodiment of the clamp 50, shown in FIG. 5B, the flange 62 and the flange 72 are separated by a gasket member 78' rather than the flange 62 and the flange 72 abutting one another. The clamp 50 may then engage the opposing flanges 62 and 72 to operatively couple the adapter 46 and the damper access duct section 44 and prevent unintentional separation thereof and to provide a fluid-tight seal therebetween. Clamp 48 may be similar to clamp 50. Clamps, such as clamps 48 and 50 are disclosed in commonly owned U.S. Pat. No. 7,997,112; U.S. Publication No. 2009/0083962; and U.S. Publication No. 2010/0038902, as set forth above.

While the embodiments disclosed herein describe the clamp 50 as coupling the damper access duct section 44 and the adapter 46 together, it will be appreciated that other clamps capable of securing these components together may be used in accordance with embodiments of the present invention disclosed herein. By way of example only, and not limitation, clamps 48 and 50 may be angle ring-type clamps with a fastener connecting opposing flanges, a drawband clamp, and a barrel clamp.

As introduced above, and with reference to FIGS. 3, 4, and 5A and 5B, the adapter 46 is operatively coupled to the damper assembly 16. In this regard and in one embodiment, the damper assembly 16 includes a collar 80, which may be a separate component attached to the enclosure 24, as shown, by bending metal tabs 83 around the edge 86 of the enclosure 24 that defines the outlet 36 or may be integral to the enclosure 24. However, there are many ways by which the collar 80 may be attached to the enclosure 24, for example, by welding or spot welding, and embodiments of the present invention are not limited to any particular method. The enclosure 24 may have sidewalls and end walls to more fully enclose the damper 22.

In the embodiment shown, the collar 80 may include a sleeve coupling 82 that extends generally perpendicular to the radially outwardly directed tab 83. The sleeve coupling 82 may further include a radially outwardly directed annular bead 84 spaced apart from the tab 83 so as to provide a recess into which the edge 86 of the enclosure 24 may extend when the collar 80 is attached to the enclosure 24.

As shown best in FIGS. 5A and 5B, the sleeve coupling 82 may further include a radiused bottom wall 88. The bottom wall 88 may have a generally constant radius of curvature although other curved or arcuate shapes of the bottom wall 88 are also contemplated. A gasket 90 may be positioned within and conform to the bottom wall 88. The gasket 90 may be configured as a double lip seal including a pair of annular sealing flanges 92a and 92b (shown best in FIG. 6A). The sealing flanges 92a and 92b may extend radially outward to sealingly engage the adapter 46, such as along the passage 66, when the adapter 46 is positioned on the collar 80 during installation of the damper access assembly 18. Thus, the flanges 92a and 92b may limit or restrict ingress or egress of fluid between the adapter 46 and the collar 80. It will be appreciated that the gasket 90 shown is merely exemplary as the gasket 90 may have any number of different configurations from that shown while forming a fluid-tight seal between the collar 80 and the adapter 46. Embodiments of the present invention are thus not limited to any particular configuration of the gasket. Exemplary gaskets suitable for use in embodiments of the present invention are disclosed in commonly owned U.S. Pat. Nos. 7,523,964; D534,253; and D529,598, which are assigned to the assignee of the present invention and are incorporated by reference herein in their entireties. By way of example, other seal configurations may include a circular cross-sectional configuration and a multiple flange configuration, for example, similar to the flanges 92a and 92b, but three or more flanges. Furthermore, each flange in such a configuration may differ from the configuration of adjacent flanges. In this regard, each flange may be of different height or width. The configuration may depend upon the application.

The adapter 46 may be slightly larger in size (e.g., larger in diameter) so that the passage 66 cooperates with the outer surface 94 of the collar 80. In other words, the adapter 46 may slip over and surround the collar 80 with the sealing flanges 92a and 92b engaging the passage 66. The end 70 of the adapter 46 may then abut the annular bead 84 when the adapter 46 is fully seated on the collar 80, as shown. In this regard, the annular bead 84 may operate as a stop for the adapter 46 and provide a visual confirmation that the adapter 46 is properly installed. In the embodiment shown in FIGS. 4, 5A, and 5B, a fastener 98, such as a sheet-metal screw, may pass through each of the adapter 46 and the collar 80 to limit movement of the adapter 46 relative to the collar 80 during normal operation of the duct system 10.

Figure 6A:
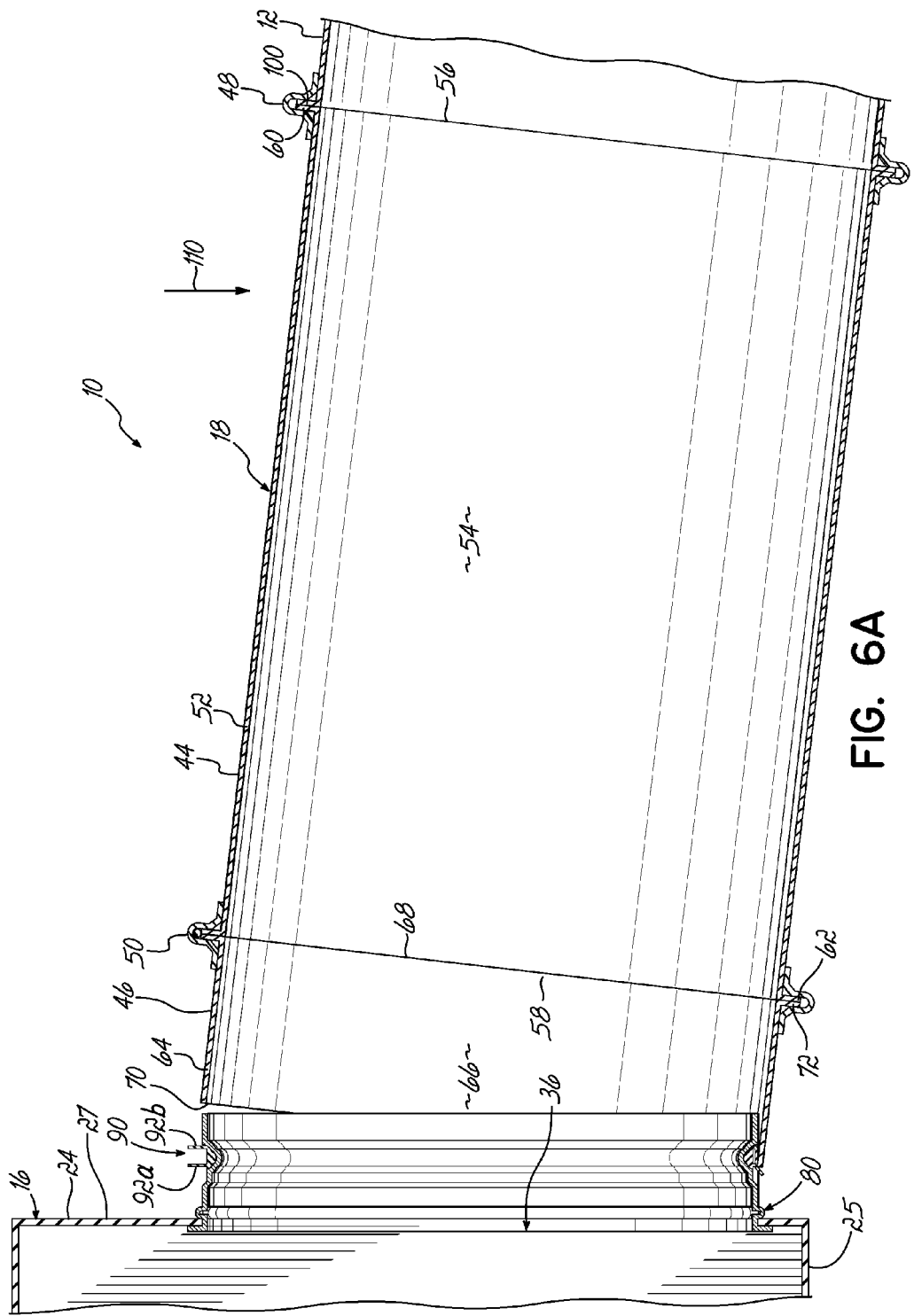
FIG. 6A is a cross-sectional view taken along section line 4-4 of FIG. 2 depicting a breakaway feature of one embodiment of the invention.

Advantageously, and with reference now to FIG. 6A, the slip-type connection between the adapter 46 and the collar 80, even if secured with one or more fasteners 98, allows the damper access assembly 18 to break away from the collar 80 in an emergency situation. For example, breakaway of the damper access assembly 18 from the collar 80 may occur in the event that the ceiling (not shown) or another portion of the building collapses onto a portion of the duct system 10 or onto the damper access assembly 18. The application of this type of load to the damper access assembly 18 is indicated by an arrow 110 in FIG. 6A. Thus, by way of example only, where the damper 22 is a fire damper, embodiments of the present invention may provide for a breakaway feature so that should the fire damper activate to contain a fire, the integrity of the fire damper in the wall 30 is maintained if a portion of a duct system 10 beyond the collar 80 collapses. The damper access assembly 18, in particular the adapter 46, may separate from the collar 80 in a manner that limits any damage to the damper assembly 16 and specifically to the damper 22.

Figure 6B:
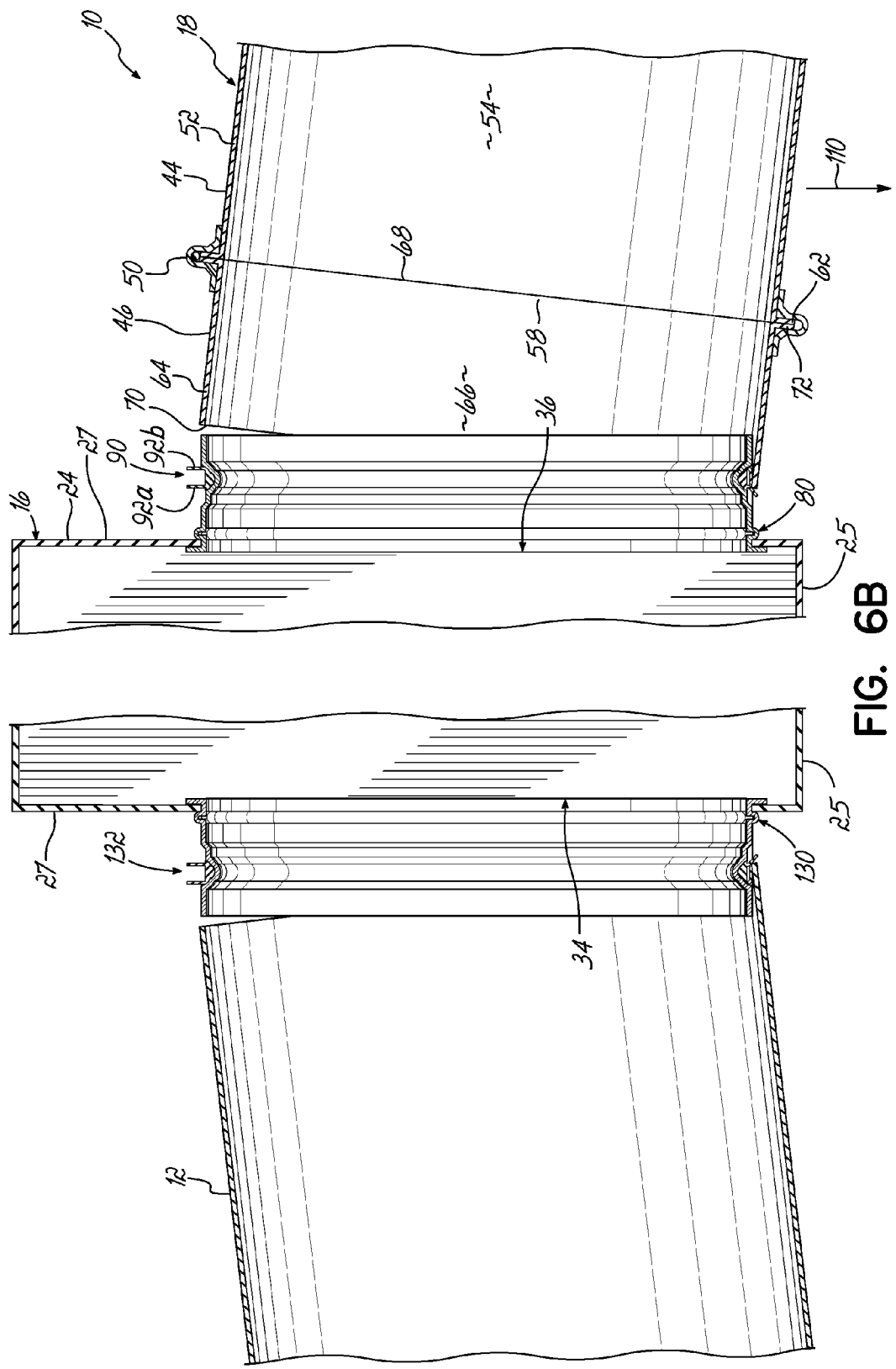
FIG. 6B is a cross-sectional view taken along section line 4-4 of FIG. 2 similar to that of FIG. 6A depicting another breakaway feature of one embodiment of the invention.

Similarly, and with reference to FIGS. 1 and 6B, in the embodiment in which the enclosure 24 includes sidewall 25 and end walls 27, the duct 12 may be operatively coupled to the enclosure 24 by a slip-type connection similar to that described above between the adapter 46 and the collar 80. As shown in FIG. 6B, a collar 130 extends from the end wall 27 that defines the inlet 34. The collar 130 may be similar to the collar 80, described above, though embodiments of the present invention are not limited thereto. A gasket 132 may be disposed on the collar 130 to sealingly engage the duct 12 when the duct 12 is slid over the collar 130. When operatively coupled thereto, duct 12 may be secured in place with one or more fasteners 98 (shown in FIG. 1). Thus, the gasket 132 may substantially prevent fluid leakage between the collar 130 and the duct 12 during normal operation of the duct system 10. However, the slip-type connection between the duct 12 and the collar 130 may allow the duct 12 to break away from the collar 130 in the event that a part of the building structure collapses onto the duct 12. Thus, by way of example only, where the damper 22 is a fire damper, embodiments of the present invention may provide for a breakaway feature so that should the fire damper activate to contain a fire, the integrity of the fire damper in the wall 30 is maintained if a portion of a duct system 10 beyond the collar 130 collapses. The duct 12 may separate from the collar 130 in a manner that limits any damage to the damper assembly 16 and specifically to the damper 22.

Figure 10:
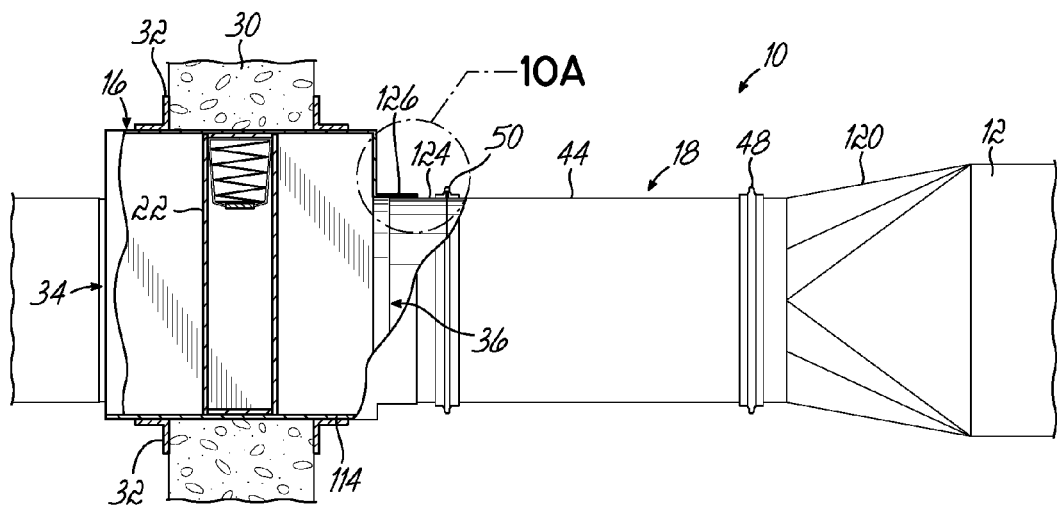
FIG. 10 is a partial cross-sectional plan view of another embodiment of the invention.
Figure 10A:
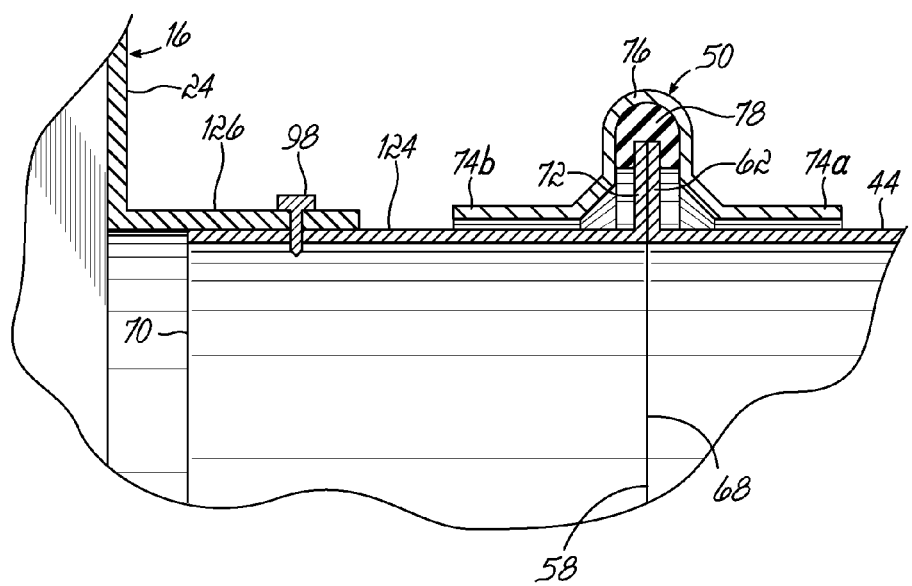
FIG. 10A is an enlarged view of the encircled area 10A in FIG. 10.

In another embodiment of the invention, as shown in FIGS. 10 and 10A, the damper access assembly 18 includes an adapter 124 and the damper access duct section 44. The enclosure 24 may have an integral collar portion 126. In this regard, the enclosure 24 may be configured as a Type C fire damper, as is known in the art. The adapter 124 may be configured to slide inside an integral collar 126 of the enclosure 24. The adapter 124 may be coupled to the integral collar 126 with a fastener 98. Neither the collar 126 nor the adapter 124 may include a gasket or seal, however, a liquid sealant may be used to form a fluid tight seal between the integral collar 126 and the adapter 124. It will be appreciated that, alternatively, the adapter 124 may slide over the outside of the integral collar 126. The joint connections between the adapter 124 and the damper access duct section 44 and between the damper access duct section 44 and the duct 12 may be similar to those as provided above with regard to FIGS. 1-5B.

With reference now to FIGS. 2, 3, and 4, the damper access assembly 18 may be coupled to the duct 12 at end 56. In particular, the flange 60 may cooperate with a flange 100 on the duct 12. In this regard, the flange 100 may be integral with the duct 12, as shown, or may be a separate annular ring of metal that may be secured to the duct 12 by welding or with fasteners (not shown). Existing duct may therefore be retrofitted with the flange 100 where it is desired to provide an existing duct system with the damper access assembly 18. Similar to the joint between the damper access duct section 44 and the adapter 46, the joint between the duct 12 and the damper access assembly 18 may include a direct abutting relationship between the flange 60 and the flange 100. The clamp 48 may then operatively couple the damper access duct section 44 to the duct 12, or a gasket (not shown) may separate the flange 60 from the flange 100 though the clamp 48 may operatively couple the damper access duct section 44 to the duct 12. The clamp 48 may be similar to the clamp 50, as shown in FIG. 5A or 5B, or may be a different clamp, such as those disclosed above.

Figure 7:
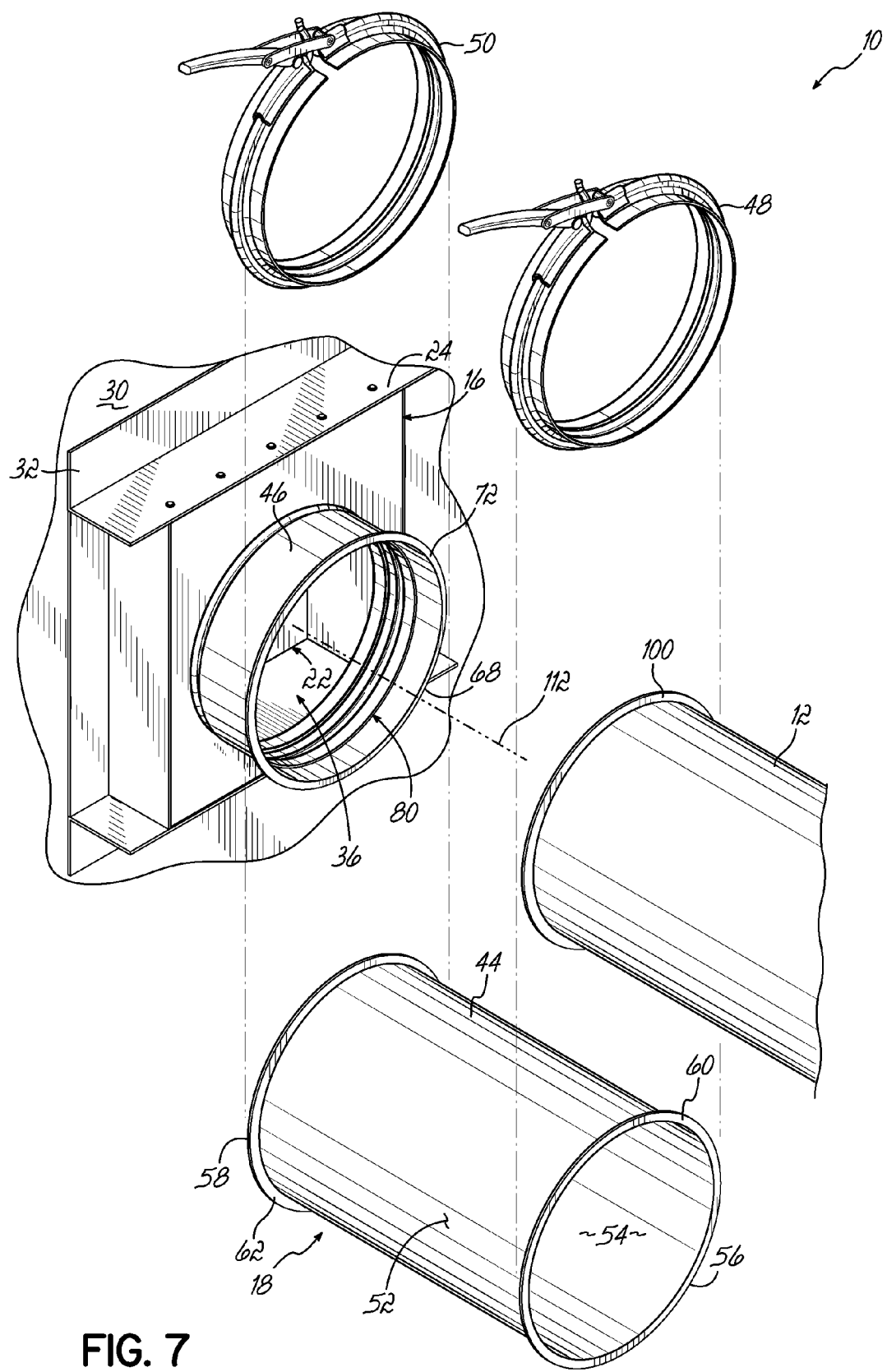
FIG. 7 is a partially disassembled perspective view of the embodiment of the invention shown in FIG. 2.

With reference now to FIGS. 2 and 7, as described above, once the damper access duct section 44 is removed from between the duct 12 and the adapter 46, a technician may directly access internal components of the duct system 10. For example, removing the damper access duct section 44 permits access to the damper 22 through the outlet 36 of the damper assembly 16. In contrast to access doors (not shown), which are often constructed into a side of a duct system and may only provide an angled access to the damper 22, according to embodiments disclosed herein, the technician may access the damper 22 more directly along a longitudinal axis 112, which may correspond to the longitudinal axis of the duct 12. Thus, in one embodiment, the duct system 10, as shown in FIG. 1, does not require an access door or panel. In addition, although not shown and not required to gain access to the internal components of the damper assembly 16, the adapter 46 may also be slipped off of the collar 80. This may only require removal of the fasteners 98, as shown in FIG. 4, and pulling the adapter 46 in the direction of the duct 12 to slip the adapter 46 from the collar 80.

Specifically, in one embodiment and with reference to FIG. 7, to remove the damper access duct section 44 from the duct system 10, a technician may disengage the clamps 48 and 50 from the corresponding joints between the damper access duct section 44 and the adapter 46 on the one end and between the damper access duct section 44 and the duct 12 at the other end. In this regard, the clamp 48 may be disengaged from the flanges 60 and 100 so that the damper access duct section 44 and the duct 12 may be movable relative to one another at this joint. The technician may then disengage the clamp 50 from the flanges 62 and 72 so that the damper access duct section 44 and the adapter 46 may be movable relative to one another at that joint. Removing each of the clamps 48 and 50 accordingly releases the damper access duct section 44 from the duct system 10. The technician may therefore remove the damper access duct section 44 and set it aside for performing inspection, maintenance, and/or repair of the internal components of the damper assembly 16, such as the damper 22. It will be appreciated that removal of the damper access duct section 44 is achieved without bending, cutting, or other permanent damage to the adapter 46 or the duct 12 so that each may be reused when the damper access duct section 44 is reattached thereto.

Once the inspection and/or maintenance of the internal components of the damper assembly 16 is complete, the technician need only reposition the damper access duct section 44 between the adapter 46 and the duct 12 to align the flanges 60 and 100 and flanges 62 and 72. Once aligned, clamps 48 and 50 may be brought into communication with the respective flanges and then reengaged to thereby operatively couple the damper access duct section 44 to each of the duct 12 and the adapter 46.

Figure 8:
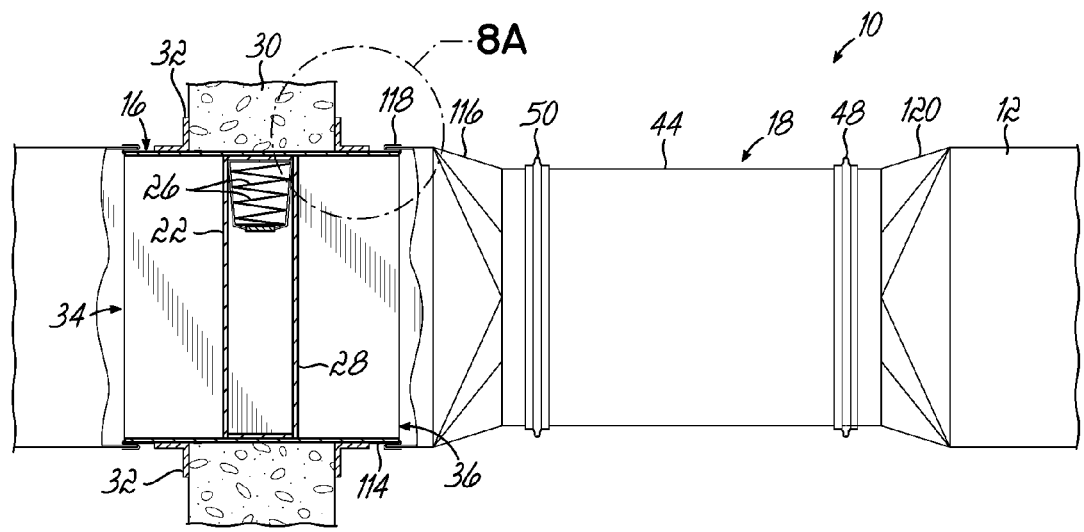
FIG. 8 is a partial cross-sectional plan view of another embodiment of the invention.
Figure 8A:
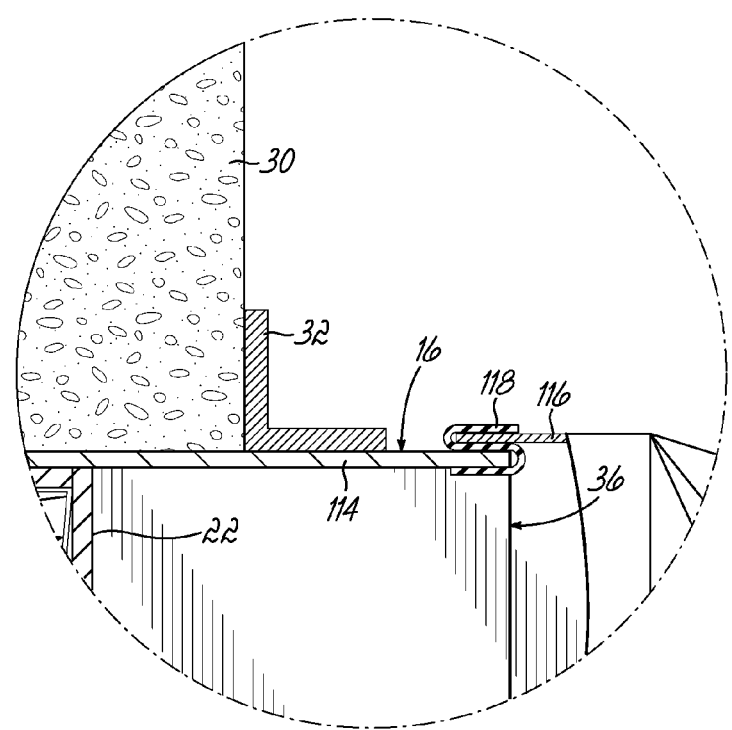
FIG. 8A is an enlarged view of the encircled area 8A in FIG. 8.

With reference now to FIG. 8, in which like reference numerals refer to like features in the figures, the damper enclosure 24 is a wall sleeve 114. Unlike the damper enclosure 24 having sidewalls and endwalls, as shown in FIG. 2, for example, the damper enclosure of this embodiment in the form of the wall sleeve 114 may be a tubular configuration, for example, a rectangular configuration. In this embodiment, the wall sleeve 114 is secured to the wall 30 by the retaining angles 32. The wall sleeve 114 thereby defines the inlet 34 and the outlet 36 in such a manner so that the inlet 34 and the outlet 36 are substantially the same cross-sectional area as the sleeve 114. It will be appreciated that by such a configuration the blades 26 and the frame 28 may extend directly into the flow of fluid within the sleeve 114. The damper access assembly 18 may include the damper access duct section 44 and an adapter 116 that may be a rectangular-to-round coupler to operatively couple to the rectangular-shaped outlet 36. The adapter 116 may be operatively coupled to the wall sleeve 114 by a breakaway connection 118. With reference to FIG. 8A, the breakaway connection 118 may be one of many duct-sleeve connections as provided in UL555, sixth edition, including, for example, a plain "S" slip, a hemmed "S" slip, a double "S" slip, an inside slip joint, and a standing S. At the other end of the damper access assembly 18, the damper access duct section 44 may be coupled to a round-to-rectangular portion 120 of the duct 12.

Figure 9:
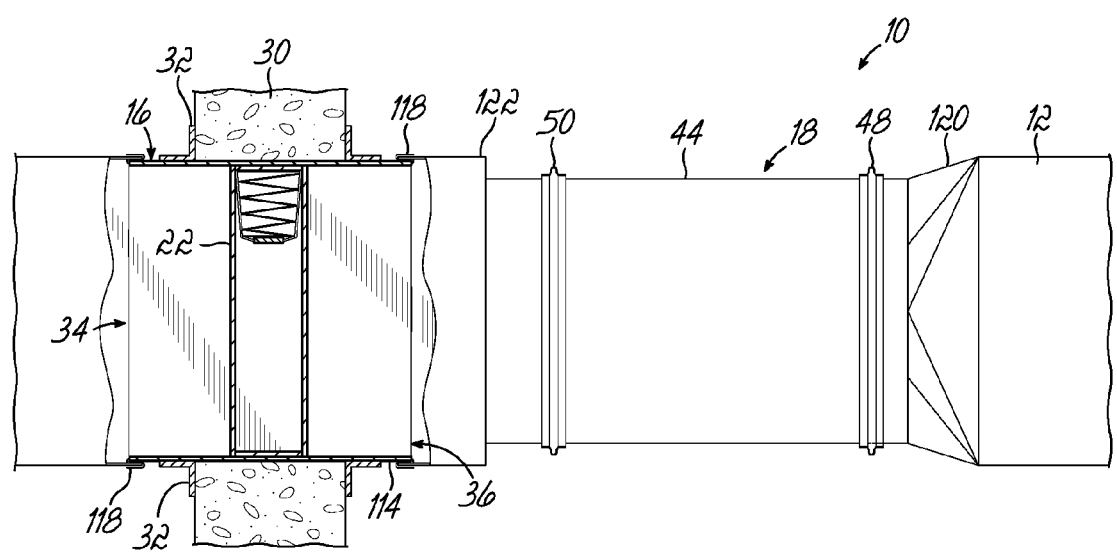
FIG. 9 is a partial cross-sectional plan view of another embodiment of the invention.

In another embodiment of the invention, as shown in FIG. 9, the damper access assembly 18 may include an adapter 122. The adapter 122 may be another configuration of a rectangular-to-round coupler that cooperates with a rectangular wall sleeve 114.

It will be appreciated that, in each of the embodiments shown in FIGS. 8, 9, and 10, the damper access duct section 44 may be removed and reinserted in a manner similar to that described above with regard to FIG. 7.

As described above, the cross-sectional configuration of the damper access assembly may vary. By way of example, and with reference to FIG. 11 in which like reference numerals refer to like features throughout the figures, a damper access assembly 140 is shown having a rectangular configuration. Such a configuration may be utilized, for example, where the duct system 10 (shown in FIG. 1) also has a rectangular configuration. Alternatively, it will be appreciated that a round-to-rectangular adapter, such as that shown in FIG. 9, may be utilized to transition a duct system having a circular configuration to one that has a rectangular configuration. Further in this regard, the rectangular configuration of the damper access assembly 140 shown in FIG. 11 may therefore be used in ducts having a generally circular cross sectional configuration.

Figure 11:
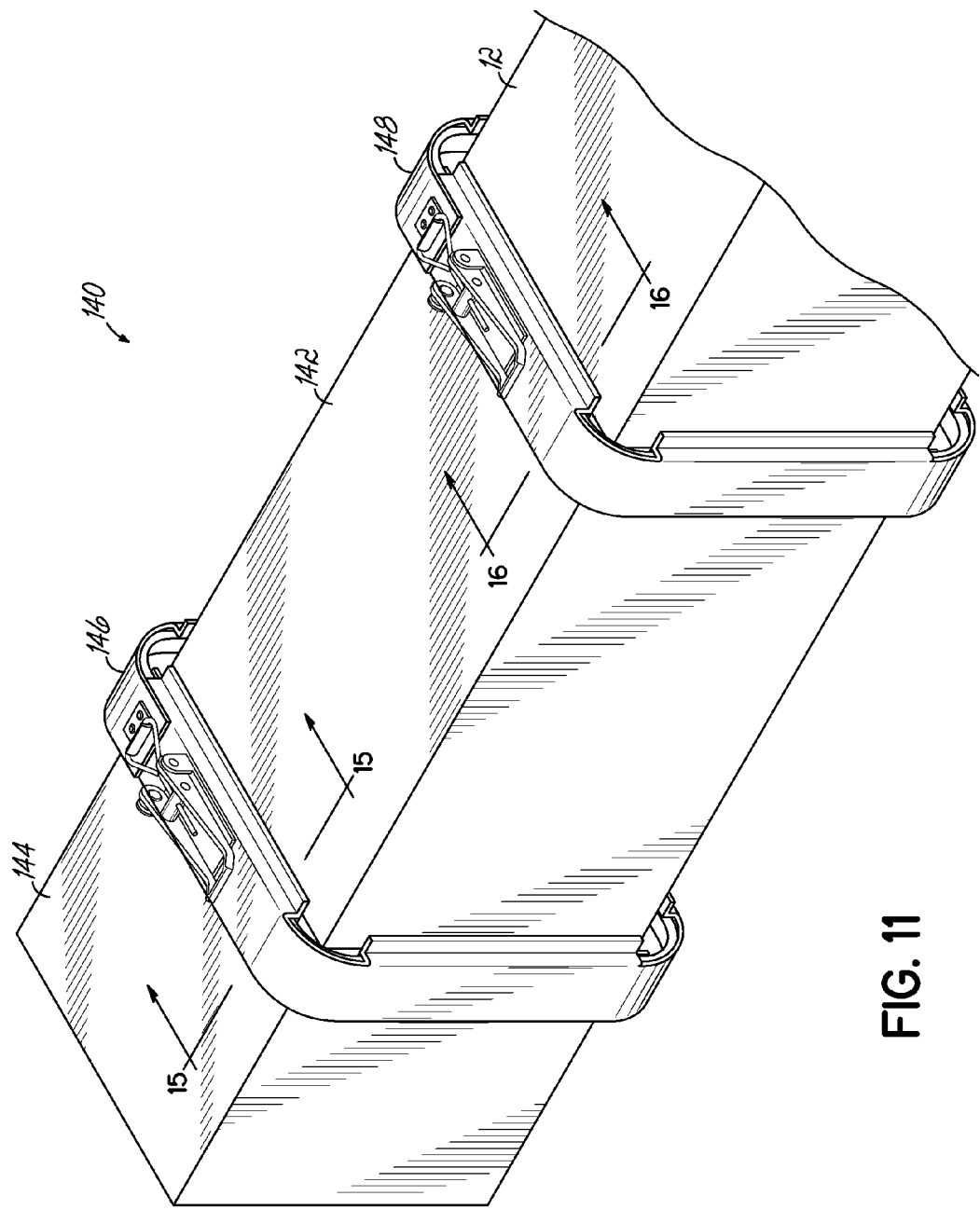
FIG. 11 is a perspective view of another embodiment of the invention.

In particular, as shown in FIG. 11, the damper access assembly 140 may be installed in the duct system to permit visual and or physical access to internal components of the duct system, as is set out above with regard to the damper access assembly 18 shown in FIG. 1. To these and other ends, the assembly 140 includes a damper access duct section 142 and an adapter 144. In the installed position, as shown in FIG. 11, the assembly 140 may be operatively coupled to a damper assembly (not shown), such as the damper assembly 16 shown in FIG. 1, at one end thereof via the adapter 144 and to the duct 12 at the other end thereof. Specifically, the adapter 144 may be operatively coupled to a damper assembly and the damper access duct section 142 may be coupled to the adapter 144 with clamps 146, 148.

Figure 12:
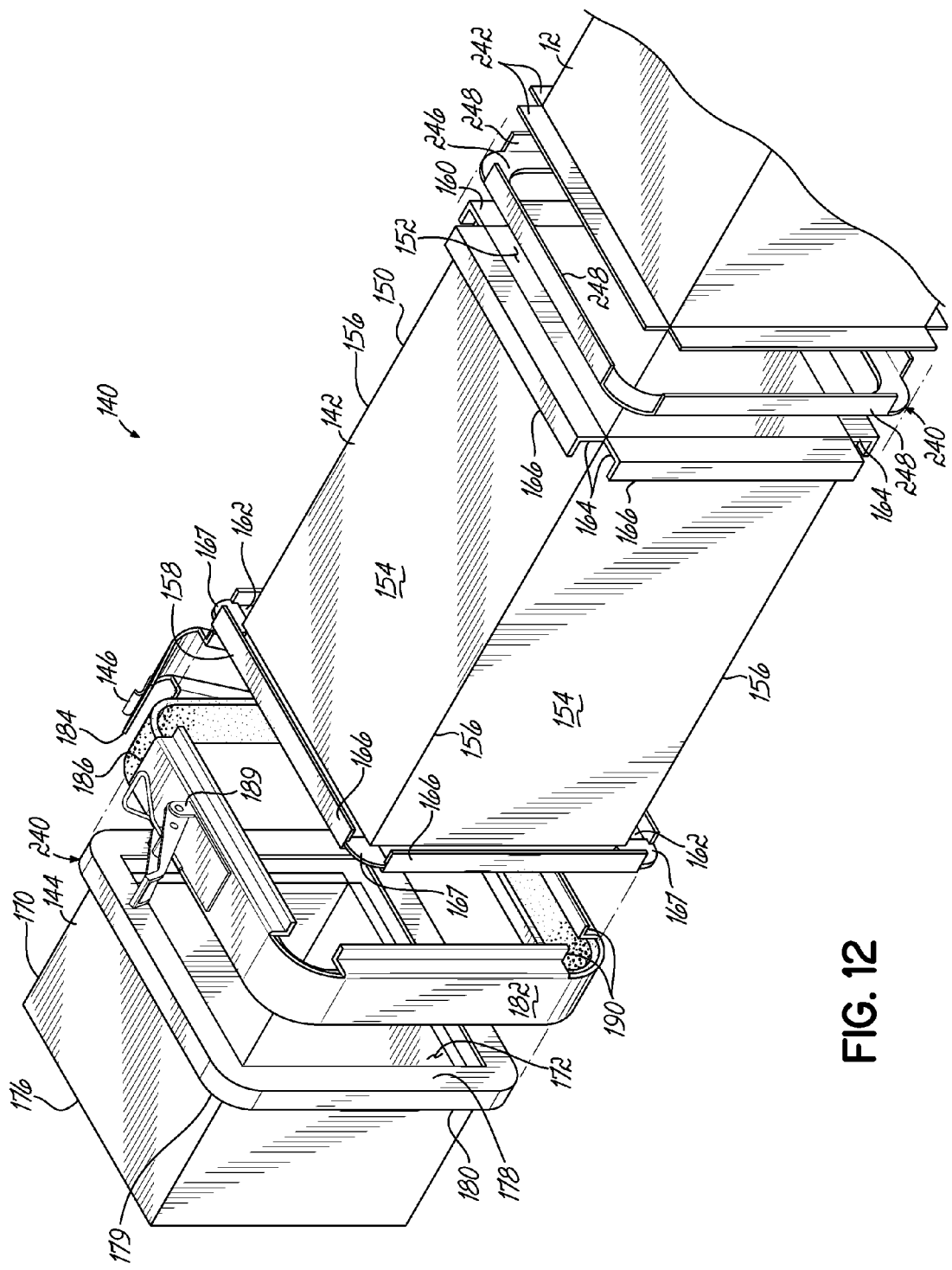
FIG. 12 is an exploded perspective view of the embodiment shown in FIG. 11.
Figure 20A:
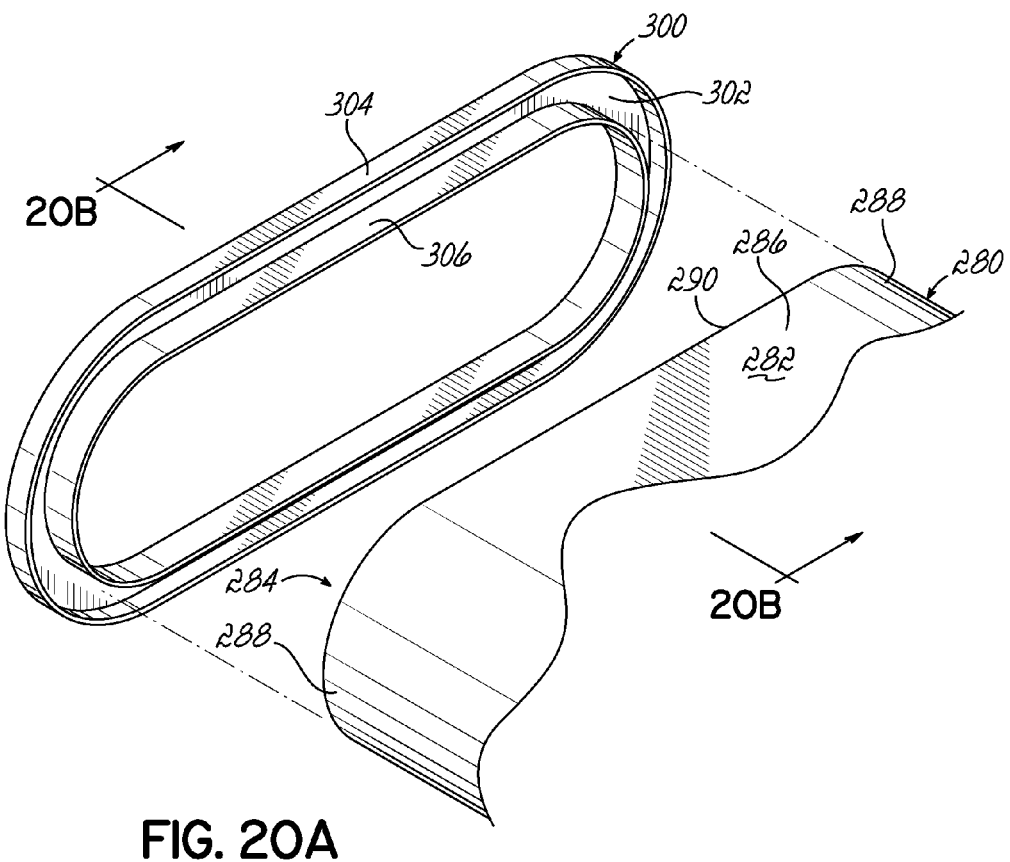
FIG. 20A is a disassembled perspective view of one embodiment of the invention.
Figure 21A:
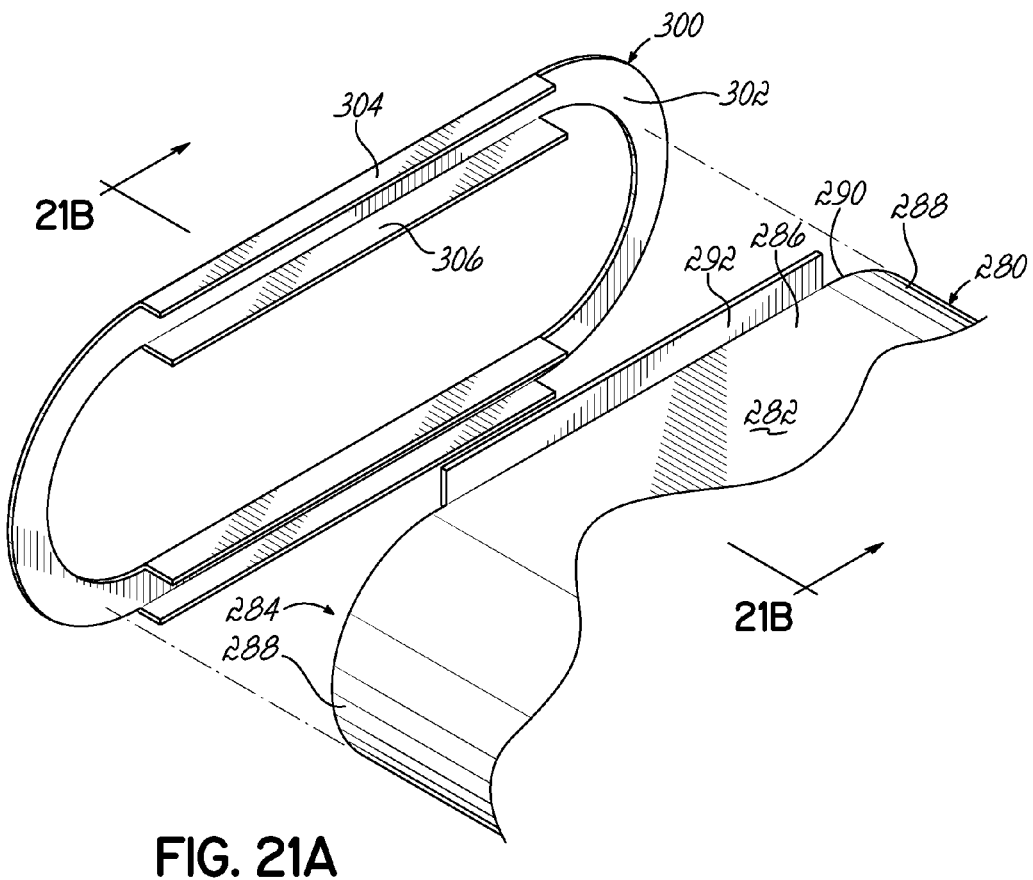
FIG. 21A is a disassembled perspective view of one embodiment of the invention.

With reference to FIG. 12, in the embodiment shown, the damper access duct section 142 has a sidewall 150 that defines a passage 152 along an internal surface thereof. The damper access duct section 142 has a tubular configuration and, in particular, has a rectangular cross-sectional configuration. In one embodiment, the cross-section of the duct section 142 is square. With regard to the rectangular configuration shown, the duct section 142 includes straight sides 154 that join at corner regions 156. It will be appreciated, however, that the duct section 142 may have other cross-sectional shapes, including for example, elliptical or oval cross-sectional shapes (as shown in FIGS. 20A and 21A). Although not shown, the duct section 142 may include a liner, such as, internal insulation, along the internal surface of the sidewall 150. Similarly, the external surface of the sidewall 150 may be covered by an external liner (not shown), such as, external insulation.

With continued reference to FIG. 12, the sidewall 150 of the damper access duct section 142 has ends 158, 160 in which each end has or is provided with a respective radially outwardly directed flange 162, 164. In one embodiment, one or both of the radially outwardly directed flanges 162, 164 are integrally formed with the sidewall 150, which configuration may be achieved by folding tabs (not shown) relative to the sidewall 150. The tabs (not shown) may be folded or bent as described in greater detail below to form the flanges 162, 164.

In addition, and with reference to FIGS. 12 and 15A, one or both of the flanges 162, 164 may include a leg 166 extending generally transverse to the radially outwardly directed portion of the respective flanges 162, 164. By way of example and without limitation, each leg 166 may extend substantially perpendicular to the radial outwardly extending portion of the respective flanges 162, 164. As shown, each leg 166 may extend generally parallel to the longitudinal axis of the duct section 142. It will be appreciated that each leg 166 may extend the full perimeter of the radially outwardly extending portion of the flanges 162, 164. In the embodiment shown, each flange 162 and 164 includes multiple circumferentially spaced-apart legs 166 around the perimeter of the sidewall 150. Spaced-apart legs 166 may correspond to the straight sides 154 of the sidewall 150. As with the formation of the flanges 162, 164, the leg 166 may be integrally formed by folding a portion of the flange 162, 164 toward the sidewall 150 so as to form a C-shape.

In one embodiment, and with reference to FIG. 12, a plurality of flanges 162 may be formed by folding a corresponding tab (not shown) integrally formed with the sidewall 150. Once the flanges 162 are formed, corner reinforcement members 167 may be secured to adjacent flanges 162 by spot welding or other means, such that, collectively, the corner reinforcement members 167 and flanges 162 extend the full perimeter of the sidewall 150. Although not shown, it will be appreciated that the corner reinforcement members 167 may be secured to adjacent flanges 164 at end 160 of the duct section 142. Furthermore, the corner reinforcement members 167 may be selectively secured to adjacent flanges 162, 164. In other words, all corner regions 156 need not be reinforced with members 167.

Figure 15:
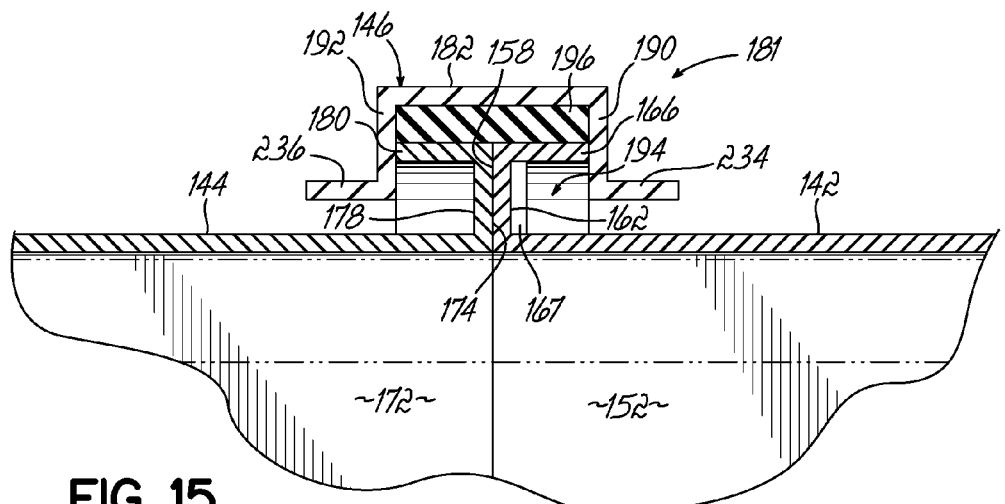
FIG. 15 is a cross-sectional view taken along section line 15-15 of FIG. 11 of a joint formed with the clamp of FIG. 13A according to one embodiment of the invention.

Similar to the adapter 46 shown in FIG. 1, and with reference to FIGS. 12 and 15, the adapter 144 includes a sidewall 170 that defines a passage 172. The sidewall 170 has ends 174 and 176. At least one of the ends 174, 176 has a radially outwardly directed flange 178. The flange 178 may be formed by methods described herein. For example, the flange 178 may be formed by folding a tab (not shown) perpendicular to the sidewall 170 and thus may be similar to the flanges 162, 164 of the duct section 142 in that regard. The adapter 144 has a rectangular configuration, which may be similar to the rectangular configuration of the duct section 142. In one embodiment, the adapter 144 has a square cross-sectional shape, though other shapes are contemplated. Further, it will be appreciated that embodiments of the invention are not limited to the adapter 144 and the duct section 142 having the same shape configuration.

Additionally, the flange 178 may include a leg 180 extending generally transverse to the radially outwardly extending portion of the flange 178. In one embodiment, each leg 180 extends at a perpendicular angle to the radially outwardly extending portion of the flange 178 and may be similar to the leg 166 described above. In this regard, each leg 180 may extend generally parallel to the longitudinal axis of the adapter 144. Each leg 180 may be formed by folding a portion of the flange 178 toward the sidewall 170 to form a C-shape. Alternatively, in embodiments in which one or more corner regions 179 are closed, that is, where the leg 180 is continuous around the circumference of the flange 178, one or both of the flange 178 and leg 180 may be separately formed in a faceplate and then the faceplate may be secured to the adapter 144, as is described in detail below.

In one embodiment, and with reference to FIGS. 11, 12, and 15, during installation, the flanges 162 on the end 158 of the duct section 142 may align with the flange 178 on the end 174 of the adapter 144 in a direct abutting relationship. That is, an outwardly facing surface of flange 162 and an outwardly facing surface of flange 178 may be in contact with one another. With reference to FIG. 15, the flange 178 in combination with the flange 162, including integrally formed legs 166, 180 forms a generally T-shaped joint 181. The clamp 146 may then be disposed over the T-shaped joint 181 so as to operatively couple the damper access duct section 142 to the adapter 144 and prevent unintentional separation thereof.

Figure 13B:
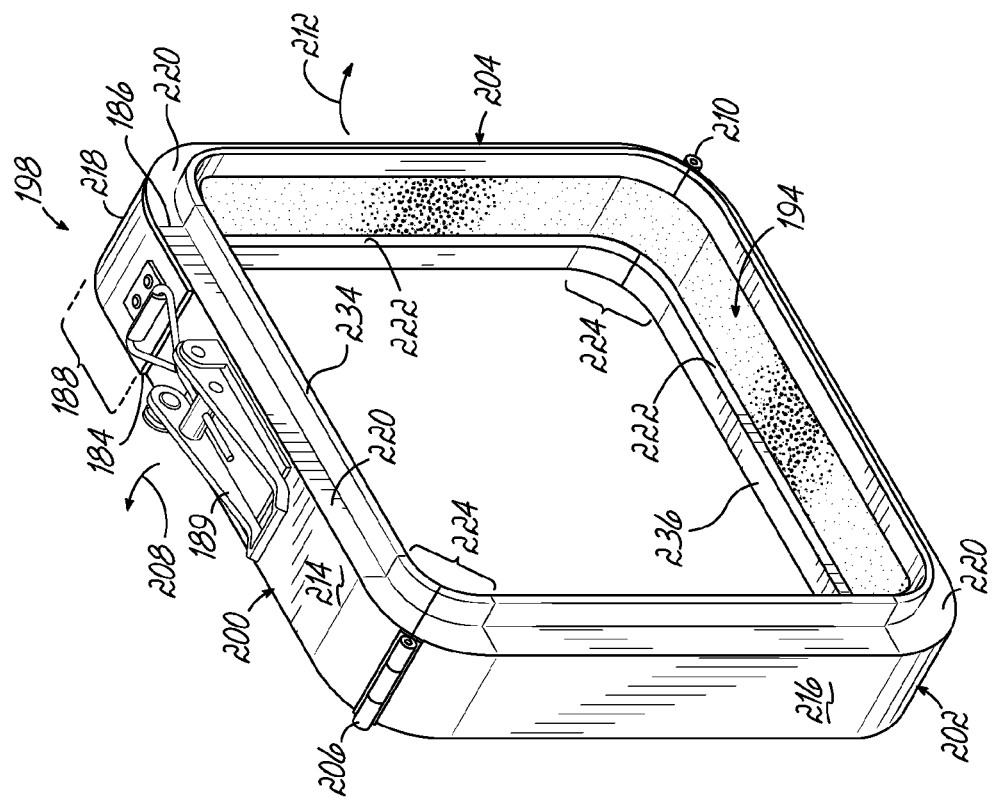
FIG. 13B is a perspective view of one embodiment of a clamp according to the invention.
Figure 13A:
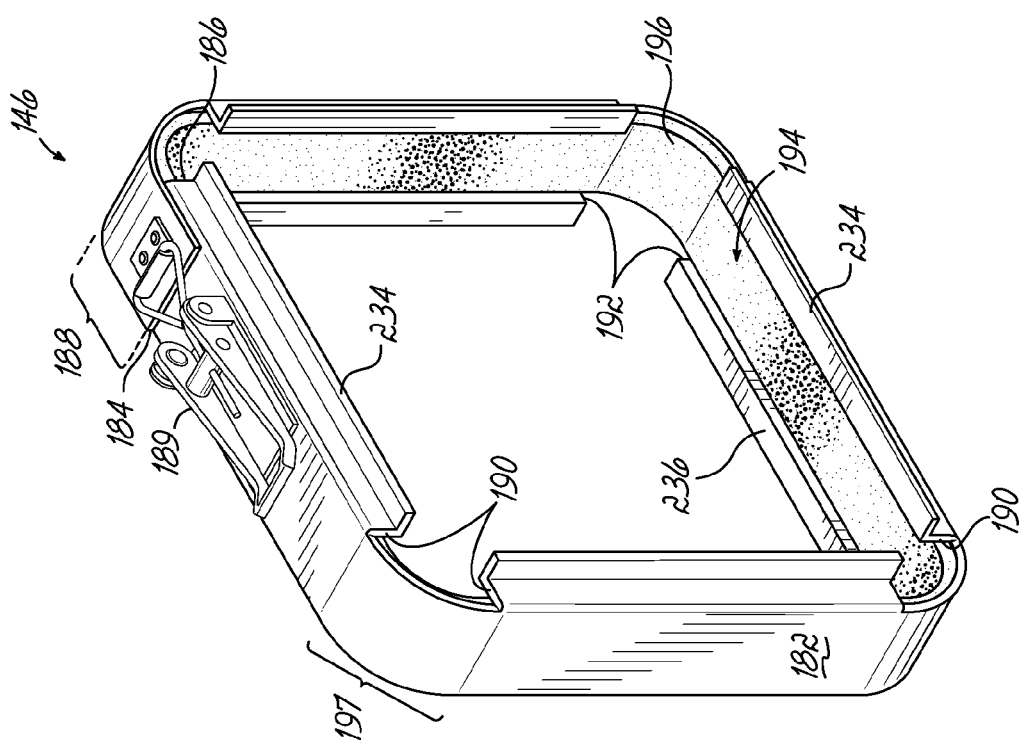
FIG. 13A is a perspective view of one embodiment of a clamp according to the invention.

With reference now to FIGS. 12 and 13A, in one embodiment, the clamp 146 includes a base portion 182 that generally defines an annular periphery of the clamp 146. As shown, the periphery may include a rectangular shaped periphery, more particularly for example, a square shaped periphery. However, it will be appreciated that the particular shape of the periphery is not limited to a rectangular one. For example, and with reference to FIGS. 14A, 14B, and 14C, a base portion may define an elliptical or oval shaped periphery.

The clamp 146 is configured to be placed at a joint between the flanges 162 and 178. To that end, the base portion 182 may have ends 184 and 186. The base portion 182 may have a length that is greater than the perimeter of the clamp 146 when it is closed. As shown in FIG. 13A, the base portion 182 may be overlapped onto itself to form an overlap region 188 between the ends 184 and 186.

In FIG. 12, the ends 184 and 186 may be separated and, although not shown, the separation of the ends 184 and 186 may be sufficient to permit installation of the clamp 146 around the joint formed by abutment of the flange 162 to the flange 178. Once the clamp 146 is installed, the ends 184 and 186 may be brought in proximity to one another and secured, for example, by a latch 189.

In operation, the clamp 146 has opened and closed positions that may be defined by the relative positions of the ends 184 and 186. The opened position permits the clamp 146 to be installed or removed from a joint. When the clamp 146 is closed, it is configured to secure two separate portions of the duct together. By way of example, clamp 146 may removably secure the duct section 142 to the adapter 144. The clamps 146, 148 are in the closed positions in FIG. 11.

With reference to FIG. 13A, in one embodiment, the clamp 146 may further include lateral portions 190 and 192 that extend generally radially inward from the base portion 182. The lateral portions 190 and 192 may confront one another to define a channel 194 therebetween. In one embodiment of the invention, a gasket member 196 is situated in the channel 194. In FIG. 15, the channel 194 of the clamp 146 cooperates with each leg 166, 180 of the joint 181 to removably secure the adapter 144 to the duct section 142. As shown, the gasket member 196 is enclosed by the base portion 182; the lateral portions 190, 192; and the legs 166, 180 and thus forms a fluid-tight seal at the T-shaped joint 181.

With reference to FIG. 13A, the lateral portions 190, 192 may not extend the full length of the perimeter of the base portion 182. In other words, lateral portions 190, 192 may be discontinuous around the perimeter of the clamp 146. In this configuration, the clamp 146 may include a plurality of lateral portions 190, 192 extending from selected regions of the base portion 182. Where there are multiple lateral portions 190, 192 extending radially inward from the base portion 182, the lateral portions 190, 192 may be spaced apart at equal intervals around the circumference of the base portion 182 and be separated by open regions 197 that may be formed by only the base portion 182. It will be appreciated that open regions 197 may facilitate installation of the clamp 146 onto the duct as they may increase the flexibility of the base portion 182 in these areas that allows the ends 184 and 186 to be further separated.

The number of lateral portions 190, 192 spaced apart along the circumference of the clamp 146 may be determined in part by the configuration of the joint. In particular, the shape of the duct section 142 and/or the adapter 144 may, in part, determine the number and location of the lateral portions 190, 192. The number of lateral portions 190, 192 may correspond to the number of flat sides of the duct to which the clamp 146 is to be attached. By way of example only and with reference to FIG. 12, where the sidewall 150 generally defines a rectangular cross-sectional configuration having four straight sides 154 joined together at four corner regions 156, the clamp 146 may include four spaced-apart lateral portions 190 and four spaced-apart lateral portions 192 each separated by base portion only or open regions 197. The configuration of the adapter 144 and/or the duct 12 may also be partly determinative of the number and location of the lateral portions 190, 192 on the clamp 146. It will be appreciated that embodiments of the present invention are not limited to the lateral portions 190, 192 shown in FIG. 12. For example, the spaced apart lateral portions 190 and spaced apart lateral portions 192 may not be coextensive in number or coextensive in length.

With reference to FIG. 13B, in another embodiment, a clamp 198 includes discrete members 200, 202 and 204. Selected pairs of members 200, 202, and 204 are operatively coupled together to allow relative movement between the selected member pairs. In particular, the members 200 and 202 may be joined by a hinge 206 so that the members 200, 202 may be moved relative (shown by arrow 208) to one another around the hinge 206 during the installation and removal of the clamp 198 from a joint. Similarly, a hinge 210 operatively connects the members 202 and 204 allowing relative movement (shown by arrow 212) between members 202 and 204 during installation and removal of the clamp 198 from a joint. Relative movement between the members 200, 202, and 204 at the corresponding hinges 206 and 210 allows sufficient separation of the ends 184 and 186 so that the clamp 198 may be installed or removed from a joint.

In addition, each of the members 200, 202, and 204 includes a corresponding base portion 214, 216, and 218 that collectively defines the annular periphery of the clamp 198. Similar to the clamp 146, shown in FIG. 13A, the base portions 214, 216, and 218 include lateral portions 220 and 222 that generally extend radially inward from the corresponding base portion. Unlike the clamp 146, however, when the clamp 198 is closed, the respective lateral portions 220, 222 extend substantially along the entire periphery of the clamp 198. In other words, the collective lateral portions 220 and 222 are continuous around the circumference of the clamp 198 along each base portion 214, 216, and 218. The corner regions 224 are therefore closed. Even though the corner regions 224 are closed, the clamp 198 may be opened via hinges 206, 210 for installation and removal.

Figure 14A:
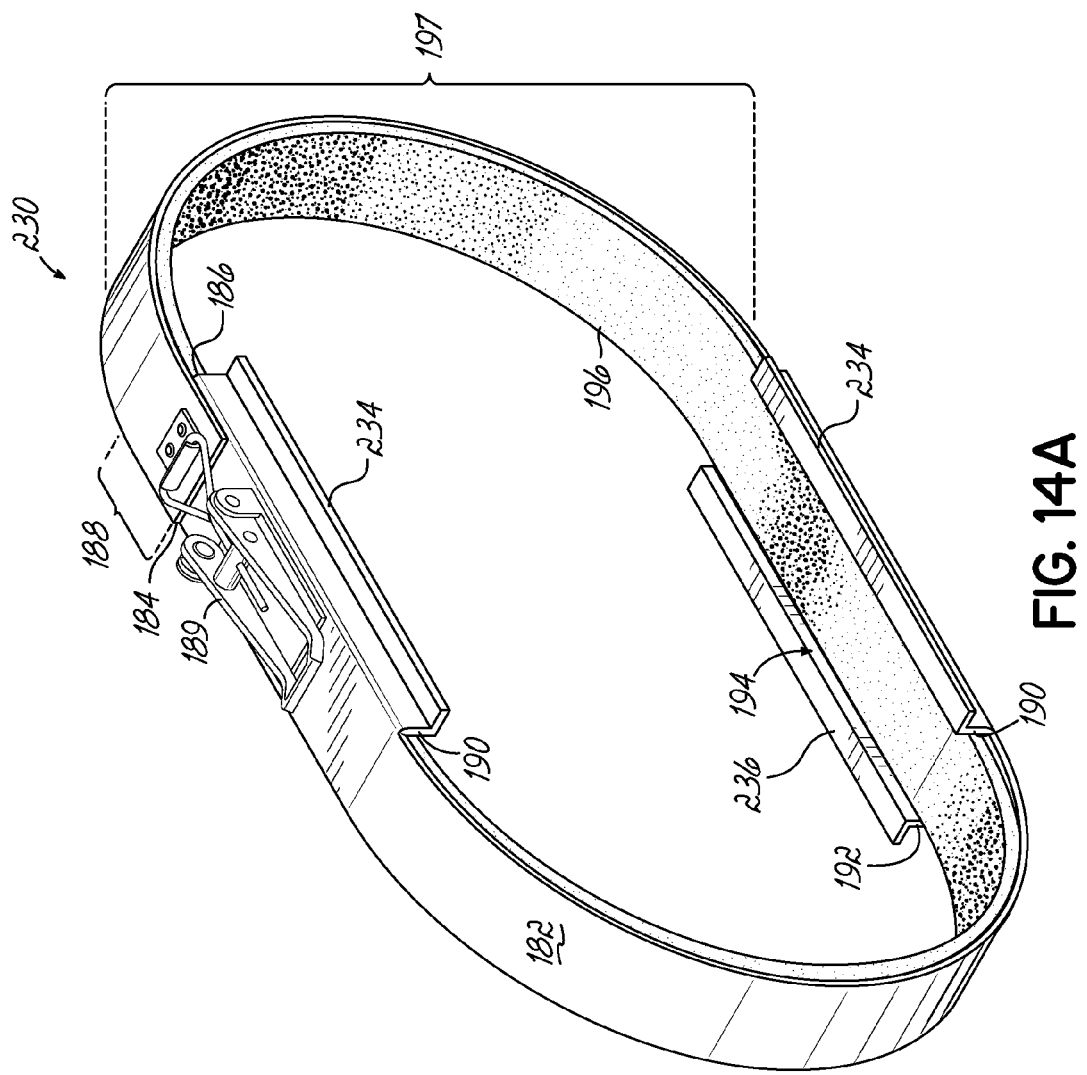
FIG. 14A is a perspective view of one embodiment of a clamp according to the invention.

As shown in FIGS. 13A and 13B, the respective clamps 146, 198 may have a rectangular configuration that generally corresponds to the cross-sectional configuration of the duct 12, as well as, the cross-sectional configurations of each of the duct section 142 and adapter 144. It will be appreciated that embodiments of the clamp as described herein are not limited to a rectangular configuration. By way of additional example and with reference to FIG. 14A, a clamp 230 has an elliptical configuration. As shown in FIG. 14A, the base portion 182 defines the annular periphery of the clamp 230. The lateral portions 190, 192 extend over only a limited length of the base portion 182. By way of example only, the lateral portions 190, 192 generally correspond to regions along the corresponding duct that are flat or straight. The base portion only or open regions 197 separate the spaced-apart lateral portions 190, 192 and generally correspond to regions of the corresponding duct that are curved. For example, curved regions may include regions between the straight sides 154. With reference to FIG. 12, the open regions 197 may correspond to the corner regions 156. In the context of an elliptical duct, as described below, the open regions 197 may correspond to the curved regions between the straight or flat sides. It will be appreciated, however, that lateral portions 190, 192 may extend over substantially all of or a portion of the curved area of the base portion 182.

Figure 14B:
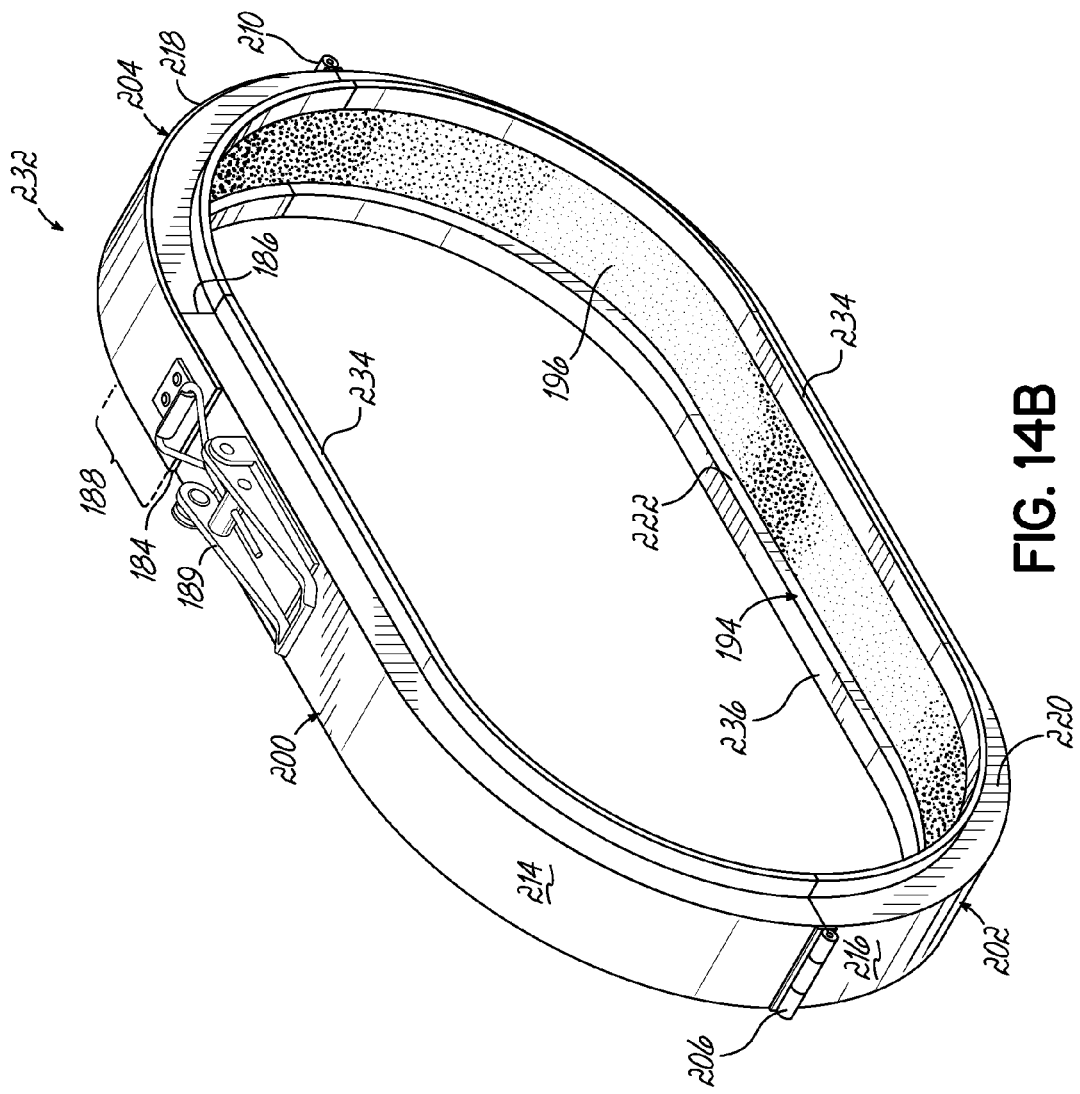
FIG. 14B is a perspective view of one embodiment of a clamp according to the invention.
Figure 14C:
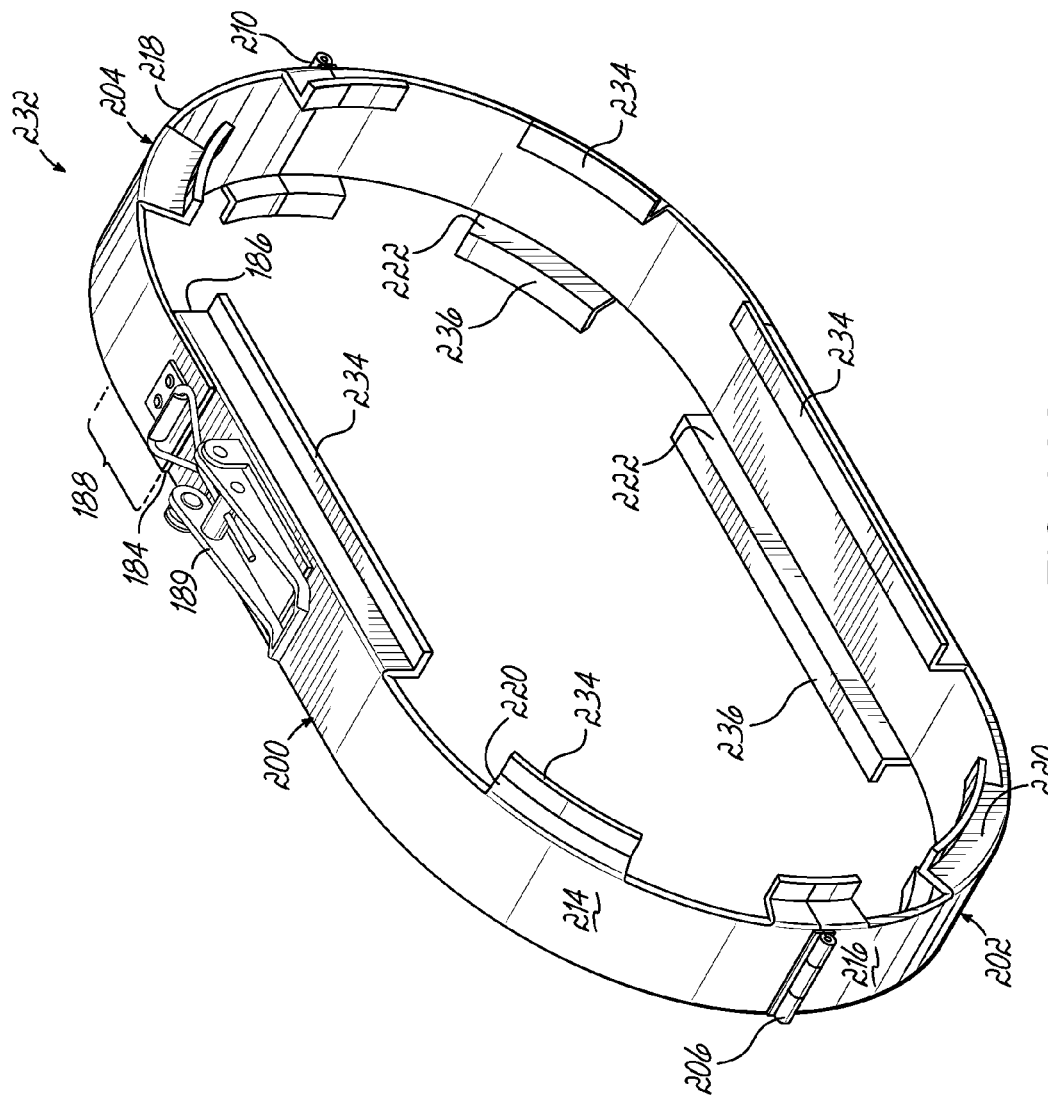
FIG. 14C is a perspective view of one embodiment of a clamp according to the invention.

Another embodiment of an elliptical clamp is shown in FIG. 14B. In particular, a clamp 232 has a similar elliptical configuration as the clamp 230 (FIG. 14A) though it includes hinges 206 and 210. The members 200, 202, and 204 of the clamp 232 are thus movable relative to one another about hinges 206 and 210. The lateral portions 220 and 222 extend substantially the entire perimeter of the clamp when the clamp 232 is closed. In other words, the lateral portions 220 and 222 extend the full length of the corresponding base portions 214, 216, and 218, including the curved portions of the members 200, 202, and 204. It will be appreciated that lateral portions 220 and/or 222 may not extend the full length of the corresponding base portions 214, 216, and 218. In this regard, as shown in FIG. 14C, the lateral portions 220 and/or 222 are circumferentially spaced-apart along each of the base portions 214, 216, and 218. While the clamp 232 in FIG. 14C is shown with hinges 206 and 210, the clamp 232 may include one of the hinges 206 or 210. Alternatively, the clamp 232 in FIG. 14C may not include any hinges.

In addition, and with reference to FIGS. 13A, 13B, 14A, 14B, 14C and 15, any single one of the clamps 146, 198, 230, and 232 may further include a longitudinal extension 234 from the corresponding lateral portion 190, 220 and a longitudinal extension 236 from the lateral portion 192, 222. The longitudinal extensions 234, 236 generally extend parallel to the longitudinal axis of the respective duct section 142 or adapter 144, as is shown best in FIG. 15. It is believed that the longitudinal extensions 234, 236 increase the rigidity of the joint formed with the clamp.

In one embodiment of the invention shown in FIG. 12, the damper access assembly 140 includes one or more faceplates 240. As will be described in detail below, the faceplates 240 may facilitate assembly of the damper access assembly 140 to an existing duct and/or facilitate assembly of the duct section 142 and the adapter 144.

Figure 16A:
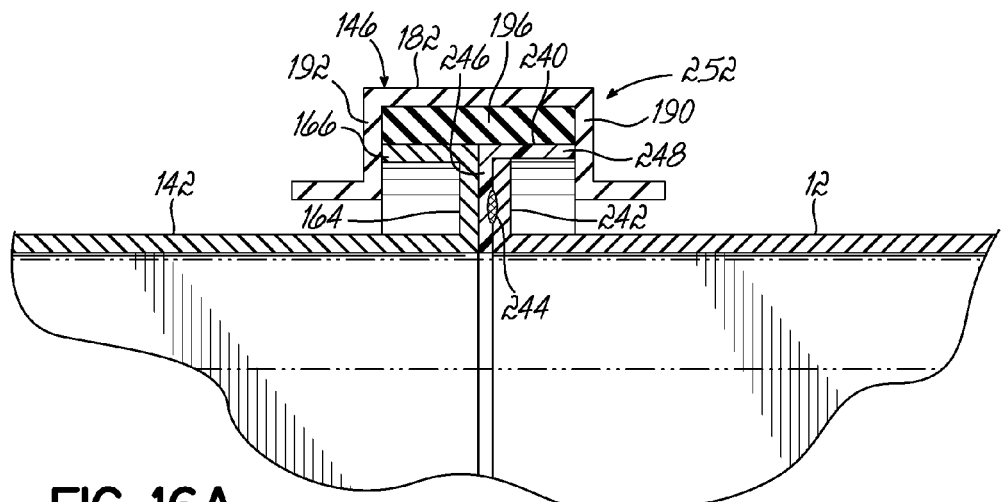
FIG. 16A is a cross-sectional view taken along section line 16-16 of FIG. 11 of a joint formed with the clamp of FIG. 13A according to another embodiment of the invention.

FIGS. 12 and 16A depict a situation where the faceplate 240 may be attached to the duct 12 and/or the faceplate 240 may be attached to the adapter 144. Thus, the faceplate 240 may be installed onto existing duct work that is being retrofitted to incorporate the duct access assembly 140 or into a new installation. As shown in FIG. 12, the duct 12 may include a radially outwardly extending flange 242. However, the flange 242 may lack sufficient structure to which one of the clamps, as described herein, may be secured to removably secure the damper access duct section 142 to the duct 12. The faceplate 240 may be initially secured to the duct 12 prior to installation of the damper access assembly 140 to improve the mechanical stability of the joint formed between the duct 12 and the duct section 142.

To that end, and with reference to FIGS. 12 and 16A, the faceplate 240 may be spot welded or secured by other methods known in the art to the flange 242 of the duct 12 as shown at 244 (FIG. 16A). The faceplate 240 includes a first leg 246 and a second leg 248. The first leg 246 is generally configured to abut an outwardly facing surface of the flange 242 of the duct 12. The second leg 248 extends from the first leg 246 at an angle and may be generally perpendicular thereto. The faceplates 240 may be made by folding a flat pattern (not shown) to form each of legs 246, 248. Alternatively, the faceplates 240 may be stamped from a sheet of material.

As shown, a plurality of legs 248 may be spaced apart along the periphery edge of the first leg 246. The spaced-apart legs 248 may be circumferentially separated by regions of the first leg 246. The locations of the spaced-apart legs 248 may be related to the configuration of the duct to which the faceplate 240 is to be attached. For example, where the duct section 142 has a rectangular configuration, as shown, the legs 248 may be positioned around the periphery of the first leg 246 and correspond to the sides 154 of the duct section 142. The regions of only the first leg 246 may correspond to the corner regions 156 of the duct section 142 that join the straight sides 154. It will be appreciated that embodiments of the invention are not limited to any particular method of folding or stamping the faceplates 240 described herein.

As shown in FIG. 16A, the faceplate 240 in combination with the flange 164, including integrally formed leg 166, forms a generally T-shaped joint 252. The channel 194 of the clamp 146 cooperates with each leg 166, 248 to removably secure the duct 12 to the duct section 142. As shown, the gasket member 196 is enclosed by the base portion 182; the lateral portions 190, 192; and the legs 166, 248 and thus forms a fluid-tight seal at the T-shaped joint 252.

Figure 16B:
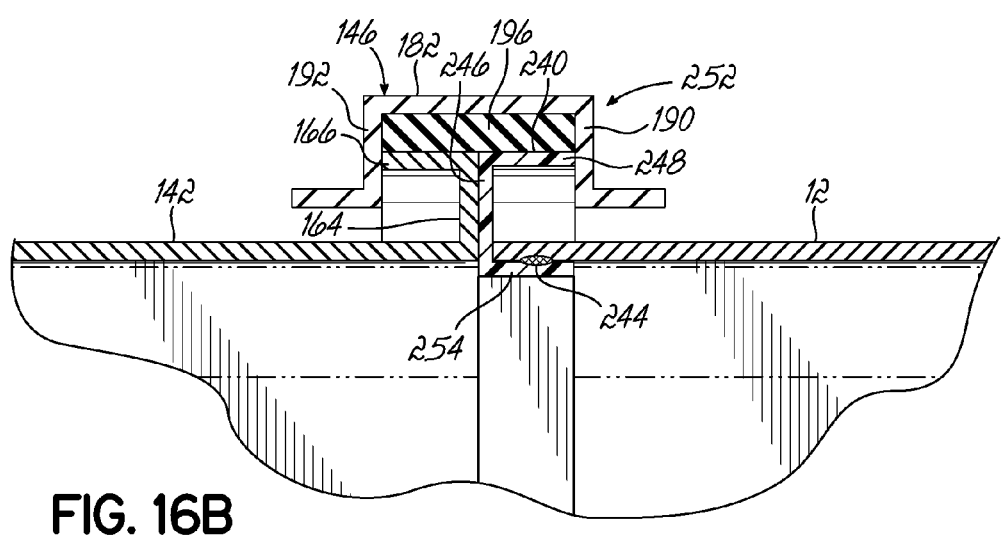
FIG. 16B is a cross-sectional view taken along section line 16-16 of FIG. 11 of a joint formed with the clamp of FIG. 13A according to another embodiment of the invention.

In one embodiment and with reference to FIG. 16B, the duct 12 may not include the flange 242, shown in FIG. 16A. In the absence of the flange 242 to which the faceplate 240 is attached, the faceplate 240 may include a third leg 254 that extends generally perpendicularly to the first leg 246. The third leg 254 may be butted against and then secured to the sidewall of the duct 12, via the spot weld 244, as shown. It will be appreciated that the third leg 254 may be secured to the exterior of the duct 12 rather than the interior of the duct 12, as shown.

The faceplate 240 is not limited solely to attachment to the duct 12. In this regard and with reference to FIGS. 17A-17F, combinations of the faceplates 240 may be arranged to form the T-shaped joint 181 between the duct section 142 and the adapter 144 and/or the T-shaped joint 252 between the duct 12 and the duct section 142.

Figure 17A:
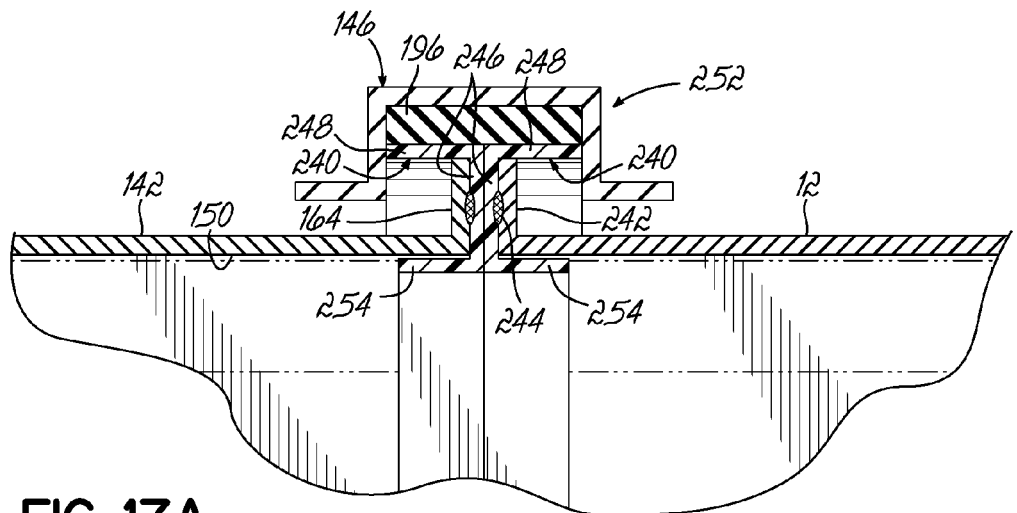
FIGS. 17A and 17B are cross-sectional views of other joint configurations taken along section line 16-16 of FIG. 11 according to embodiments of the invention.
Figure 17B:
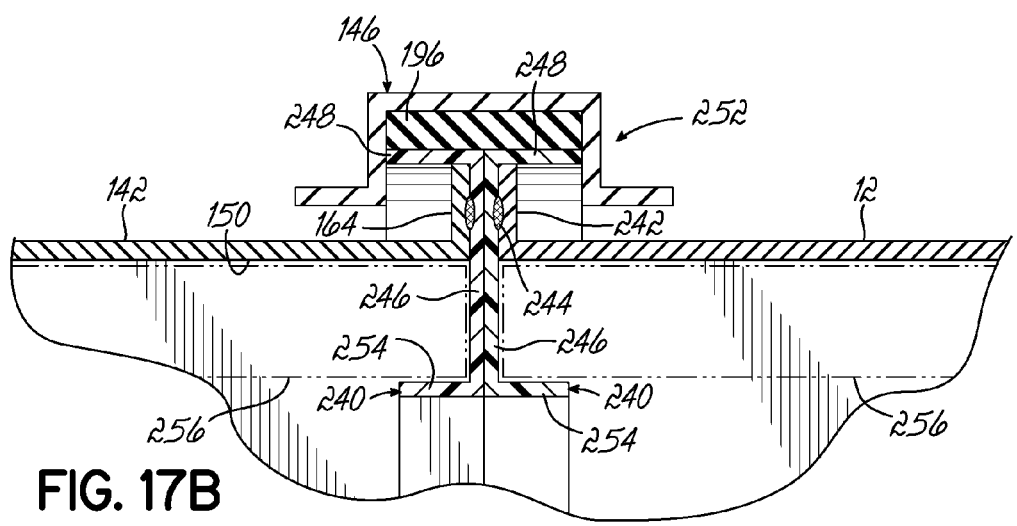

For example, and with reference specifically to FIG. 17A, a pair of faceplates 240 may be individually secured to each of the duct section 142, which does not include the leg 180, and the duct 12. Because each of the section 142 and the duct 12 lacks any leg extending substantially parallel to the longitudinal axis of the duct, the faceplates 240 may be attached thereto so as to form the T-shaped joint 252. Additionally, the faceplate 240 may further include the third leg 254 extending at a transverse angle from the first leg 246 generally in the same direction as the second leg 248 thereby forming a generally C-shaped cross section.

As shown in FIG. 17A, the third leg 254 may cooperate with the interior surface of the sidewall 150 of the duct section 142. This configuration may advantageously facilitate installation of the faceplate 240 onto the respective duct portion. The faceplate 240 may remain in place long enough that it may be secured thereto in a subsequent operation (for example, by spot welding). And, with reference to FIG. 17B, the first leg 246 of the faceplate 240 may be extended with the third leg 254 oriented to cooperate with any insulation or lining 256 on the interior surface of the respective duct portion.

Figure 17C:
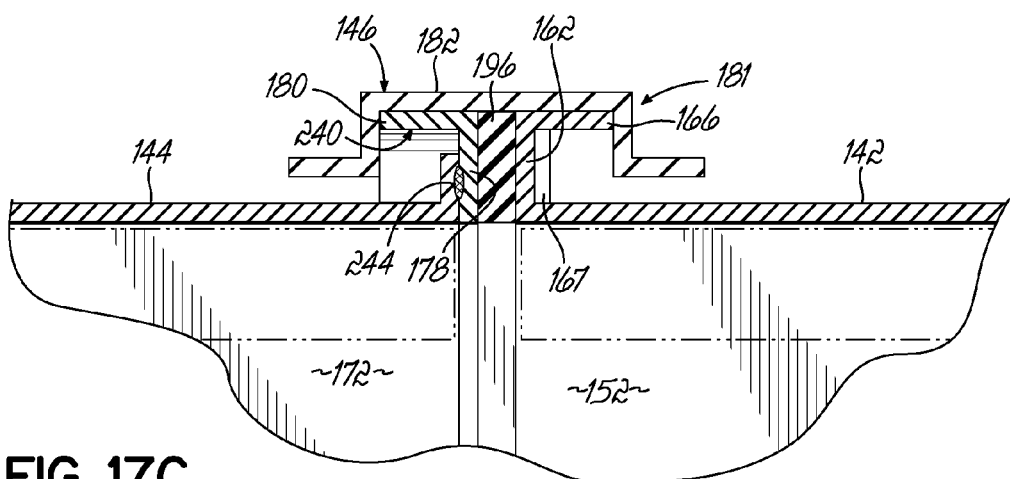
FIG. 17C is a cross-sectional view taken along section line 15-15 of FIG. 11 of a joint formed according to another embodiment of the invention.
Figure 17D:
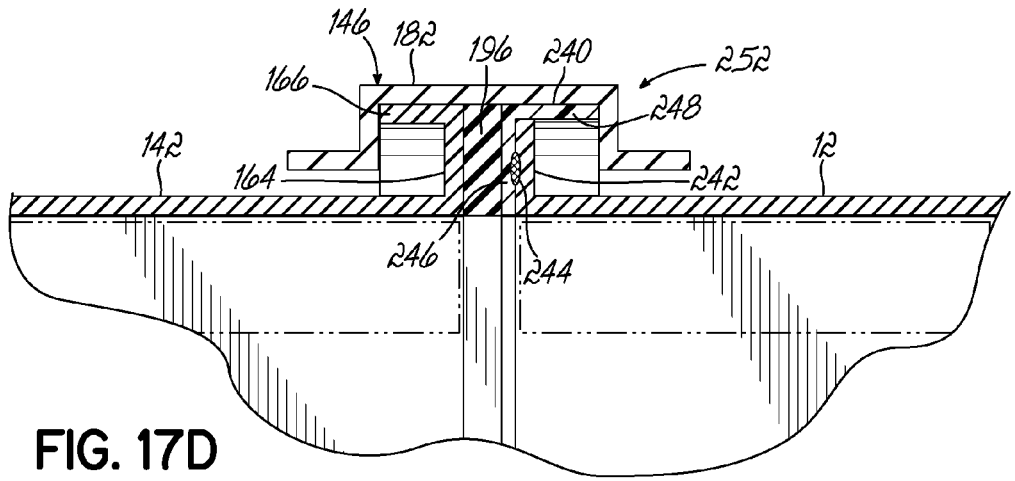
FIGS. 17D, 17E, and 17F are cross-sectional views of other joint configurations taken along section line 16-16 of FIG. 11 according to embodiments of the invention.
Figure 17E:
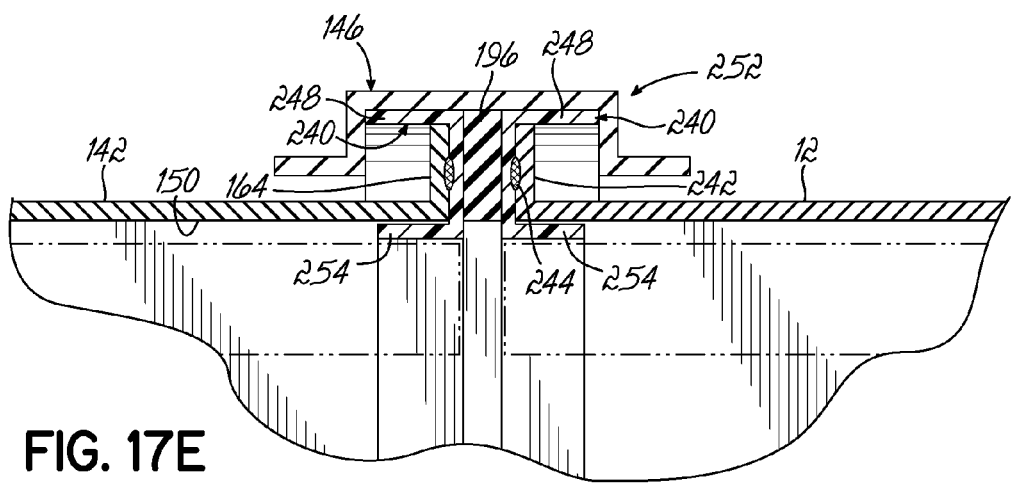
Figure 17F:
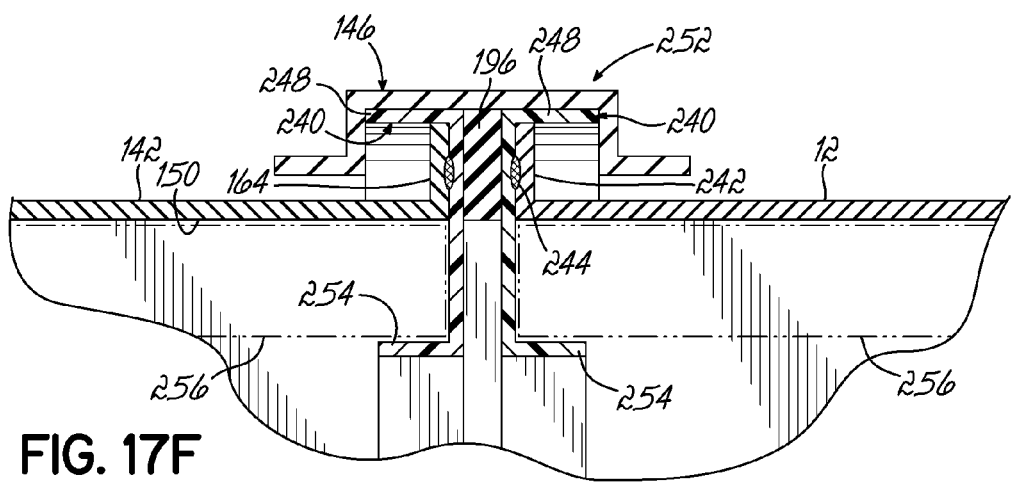

With reference to FIG. 17C, the T-shaped joint 181 is formed by the combination of leg 166 and leg 180, though the joint differs in that the gasket member 196 is sandwiched between the flanges 162 and 178. In addition, the faceplate 240 forms the flange 178 and the leg 180. The faceplate 240 is secured to the adapter 144, as described above. FIGS. 17D-17F depict additional embodiments in which the faceplate 240 is secured to the duct 12 and/or the duct section 142, however, the gasket member 196 is sandwiched between the opposing faceplates 240 rather than between the base portion and the legs.

Figure 18:
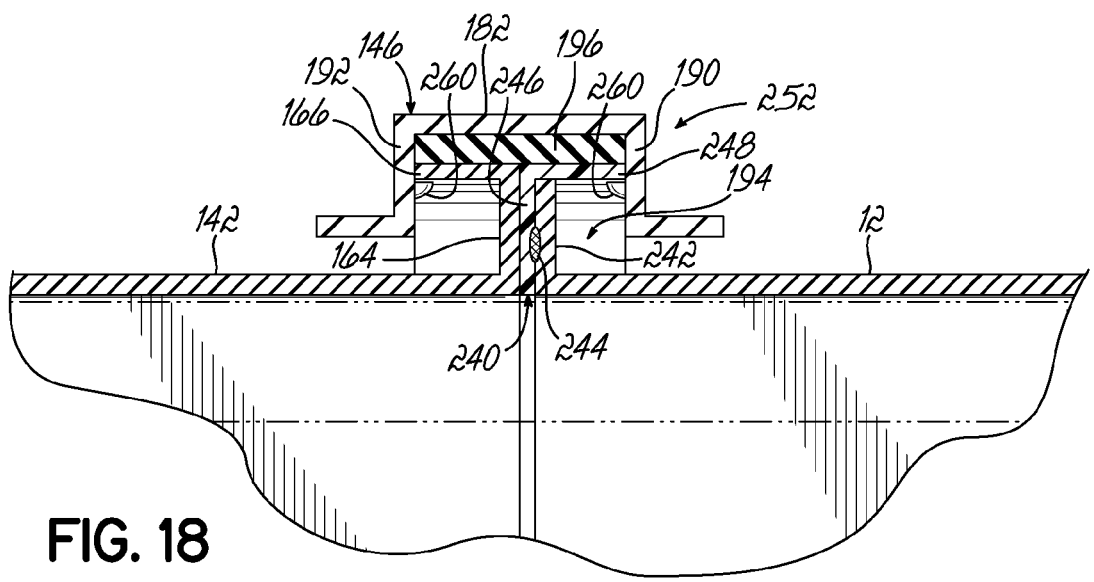
FIG. 18 is a cross-sectional view of a joint formed according to one embodiment of the invention.
Figure 19:
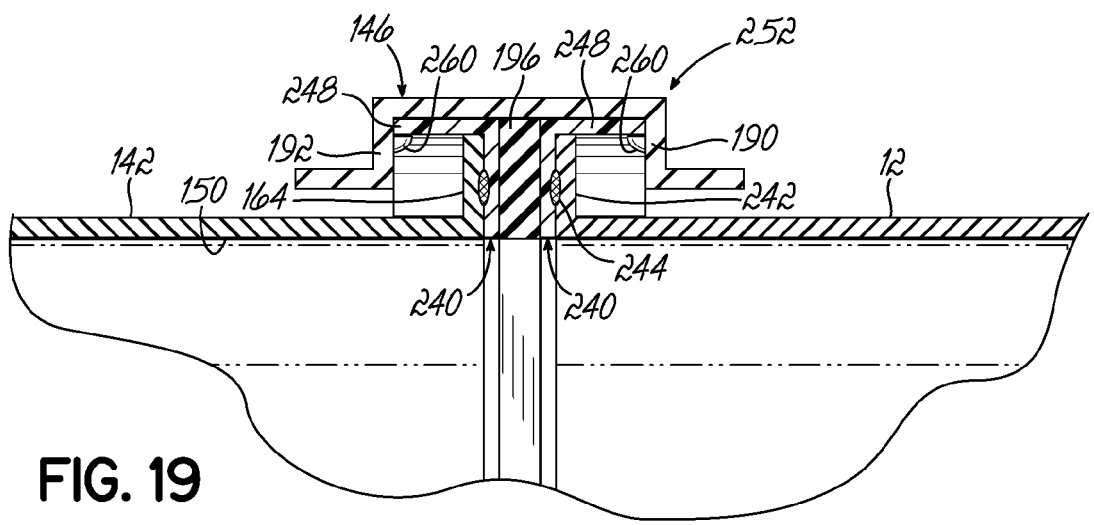
FIG. 19 is a cross-sectional view of a joint formed according to one embodiment of the invention.

In one embodiment of the invention depicted in FIGS. 18 and 19, the clamp 146 further includes a dimple or restriction element 260 that projects into the channel 194 from one or both lateral portions 190, 192. As shown, multiple dimples 260 may directly oppose one another. However, embodiments of the invention are not limited to the configuration shown. The dimples 260 may be offset from one another across the channel 194 or the dimples 260 may extend only from the lateral portion 190 or from the lateral portion 192, but not both. Advantageously, the dimples 260 may improve the structural integrity of the joint 181, 252 by contacting the faceplate 240. In particular, the dimple 260 may include a flat surface which supports or contacts the second leg 248 of the faceplate 240 thereby further restricting relative motion between the clamp 146 and the faceplate 240. In other words, the dimples 260 inhibit movement of the clamp 146 away from the T-shaped joint 181, 252.

As set out above and with reference now to FIG. 20A, in one embodiment of the invention, a damper access duct section 280 has a sidewall 282 that defines a passage 284 along an internal surface thereof. The section 280 is similar to the damper access duct section 142 described above and shown in FIG. 12 though the duct section 280 differs in cross-sectional configuration. As shown, the duct section 280 is oval shaped but is similar to the duct section 142 in other respects. Nevertheless, the duct section 280 will be briefly described.

The damper access duct section 280 has a tubular configuration and, in particular, has an oval cross-sectional configuration. With regard to the oval configuration shown, the duct section 280 includes straight sides 286 that are connected by curved sides 288. It will be appreciated that the sides 286 may be much longer or shorter than those shown, that is, oval configurations of the duct section 280 are not restricted to the specific cross-sectional shape shown. In addition, the duct section 280 may include a liner, such as, internal insulation, along the passage 284. Similarly, the external surface of the sidewall 280 may be covered by an external liner (not shown), such as, external insulation.

The sidewall 282 of the damper access duct section 280 has at least one end 290. In addition, in one embodiment, a faceplate 300 may be secured to end 290 of the duct section 280 similar to the faceplate 240 set out above. As shown, the faceplate 300 may include a flange 302 and one or more legs 304. A second leg 306 may generally extend in the same direction from the flange 302 as the leg 304. Legs 304, 306 may be similar to legs 248, 254, respectively, in that regard. Further, the faceplate 300 may be made according to similar methods disclosed above with regard to folding or stamping the faceplate 240. As shown, the legs 304, 306 may configured to extend continuously around the perimeter of the flange 302 so as to encompass the entire end 290 of the duct section 280 when the faceplate 300 is assembled on the section 280.

Figure 20B:
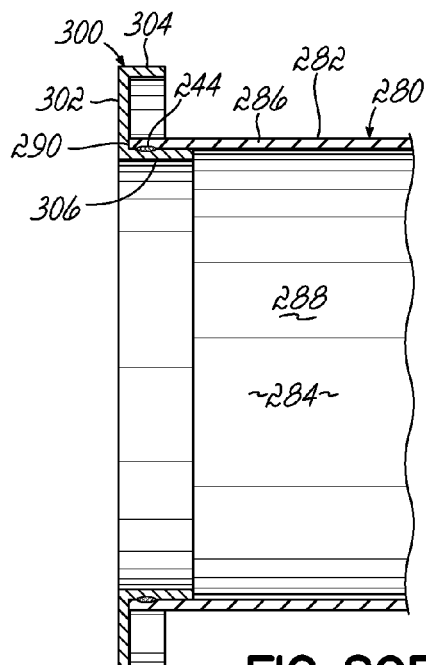
FIG. 20B is a cross-sectional view taken along section line 20B-20B of FIG. 20A following assembly.

In the embodiment shown in FIGS. 20A and 20B, in which the duct section 280 lacks an outwardly-directed flange, the faceplate 300 may be attached to the duct section 280 along the sidewall 282. For example, the faceplate 300 may be spot welded to the duct section 280 at 244 within the passage 284 (FIG. 20B). The leg 306 may extend along the interior of the sidewall 282 with the leg 304 being provided externally to form a joint with another duct section and secured with a clamp, such as, the clamp 230 (FIG. 14A) or the clamp 232 (FIGS. 14B and 14C).

Figure 21B:
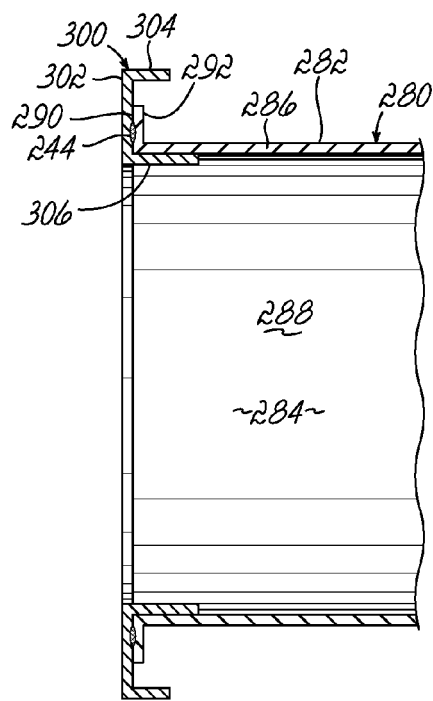
FIG. 21B is a cross-sectional view taken along section line 21B-21B of FIG. 21A following assembly.

In one embodiment, shown in FIGS. 21A and 21B, the duct section 280 may include a radially outwardly directed flange 292 at end 290. For example, the flange 292 may be provided only along selected portions of the duct section 280, such as the straight sides 286 thereof. In one embodiment, the faceplate 300 may include legs 304 and 306 extending from the flange 302 only along selected portions thereof, such as the straight portions thereof, as shown, which may correspond in location to the sides 286. Regions of only the leg 302 may correspond to the curved sides 288 or to those regions between the straight sides 286 of the duct 280. The faceplate 300 may be secured to the flange 292, similar to the faceplate 240 as set out above, by spot welds at 244. Once the faceplate 300 is attached to the duct section 280, the legs 304, 306 cooperate with the duct section 280. The faceplate 300 is configured to form a joint with an adjacent ductwork or adapter similar to the faceplate 240 and secured with a clamp, such as, the clamp 230 (FIG. 14A) or the clamp 232 (FIGS. 14B and 14C).

While the present invention has been illustrated by description of various embodiments and while those embodiments have been described in considerable detail, it is not the intention of applicants to restrict or in any way limit the scope of the appended claims to such details. Additional advantages and modifications will readily appear to those skilled in the art. The invention in its broader aspects is therefore not limited to the specific details and illustrative examples shown and described. Accordingly, departures may be made from such details without departing from the spirit or scope of applicants' invention.

Having described the invention, what is claimed is:

1. A clamp assembly for joining a first outwardly directed flange of a first duct with a second outwardly directed flange of a second duct, the outwardly directed flanges being configured to confront one another and define a gap therebetween to form a joint, the assembly comprising:
a circumferential clamp member including a base portion defining an annular periphery of the member and first lateral portions and second lateral portions each extending inwardly from the base portion, the first lateral portions being generally parallel to the second lateral portions to define a channel therebetween for receiving the first and second flanges, the first lateral portions and second lateral portions including longitudinal extensions that extend away from the channel to increase rigidity of the joint.

2. The clamp assembly of claim 1, wherein the first lateral portions include a plurality of circumferentially spaced-apart first lateral portions and the second lateral portions include a plurality of circumferentially spaced-apart second lateral portions.

3. The clamp assembly of claim 2, wherein the duct includes a plurality of straight sides and wherein the number of spaced-apart first lateral portions and the number of spaced-apart second lateral portions correspond to the number of straight sides of the first and second ducts.

4. The clamp assembly of claim 2, wherein the spaced-apart first lateral portions and the spaced-apart second lateral portions are circumferentially separated by base-portion-only regions.

5. The clamp assembly of claim 4, wherein the base-portion-only regions of the clamp member correspond to regions between the straight sides of the first and second ducts.

6. The clamp assembly of claim 1, wherein each of the first and second lateral portions is discontinuous at one region along the circumferential length of the clamp member.

7. The clamp assembly of claim 1, wherein each of the first outwardly directed flange and the second outwardly directed flange includes a leg extending transversely therefrom, the transverse legs being configured to form a generally T-shaped joint when the first flange confronts the second flange, wherein the channel of the clamp member is configured to receive the T-shaped joint therein.

8. The clamp assembly of claim 1, further comprising:
at least one faceplate configured to be secured to one of the first duct or the second duct, the faceplate including a first leg and a second leg extending at an angle transverse to the first leg, wherein the clamp member is configured to receive at least one of the first leg or the second leg therein.

9. The clamp assembly of claim 8, wherein each of the first duct and the second duct includes a sidewall, and wherein the faceplate further includes a third leg configured to cooperate with the sidewall of one of the first duct section or the second duct section.

10. The clamp assembly of claim 1, further comprising:
a first faceplate configured to be secured to the first duct and a second faceplate configured to be secured to the second duct, the first and second faceplates each including a first leg configured to be secured to a respective duct and a second leg oriented at a transverse angle relative to the first leg, and, when secured to the corresponding duct, the first and second faceplates are configured to form a generally T-shaped joint between the first and second ducts,
wherein the channel is configured to receive the T-shaped joint therein.

11. The clamp assembly of claim 10, wherein the first legs of each of the faceplates extend along the entire periphery of the respective duct and the second legs of one or both of the first and second faceplates are discontinuous along the periphery of the respective duct so as to form spaced-apart first-leg-only regions.

12. The clamp assembly of claim 11, wherein one of the first duct or the second duct includes a plurality of spaced-apart straight sides and wherein the first-leg-only regions correspond to regions of the duct between the spaced-apart straight sides.

13. A clamp assembly for joining a first outwardly directed flange of a first duct with a second outwardly directed flange of a second duct, the flanges being configured to confront one another and define a gap therebetween to form a joint, the assembly comprising:
 a first member;
 a second member; and
 a hinge operatively coupling the first clamp member to the second clamp member to form at least a portion of a circumferential clamp member, the first member being moveable relative to the second member by the hinge between an opened position in which the clamp member is installable onto the first and second ducts and a closed position in which the assembly engages each of the first and second flanges,
 wherein each of the first and second members includes a base portion, a first lateral portion, and a second lateral portion, the first lateral portion and the second lateral portion each extend inwardly from the base portion, the first lateral portion being generally parallel to the second lateral portion to define a channel therebetween for receiving the first and second flanges, the first lateral portions and the second lateral portions including longitudinal extensions that extend away from the channel to increase rigidity of the joint.

14. The clamp assembly of claim 13, wherein each of the first and second outwardly extending flanges includes a leg extending transversely therefrom, the legs collectively forming a generally T-shaped joint when the first flange confronts the second flange, and wherein the channel of the circumferential clamp member is configured to receive the T-shaped joint therein.

15. The clamp assembly of claim 13 further comprising:
 at least one faceplate configured to be secured to at least one of the first or the second ducts, the faceplate including a first leg configured to be secured to the duct section and a second leg oriented at a transverse angle with respect to the first leg, wherein the clamp member is configured to receive the faceplate therein.

16. The clamp assembly of claim 13 further comprising:
 a first faceplate configured to be secured to the first duct and a second faceplate configured to be secured to the second duct, the first and second faceplates each including a first leg configured to be secured to a respective duct and a second leg oriented at a transverse angle with respect to the first leg, the first and second faceplates being configured to form a generally T-shaped joint between the first and second ducts,
 wherein the channel of the clamp member is configured to receive the T-shaped joint therein.

17. The clamp assembly of claim 16, wherein the first legs of each of the faceplates extend along the entire periphery of the respective duct and the second legs of one or both of the first and second faceplates are discontinuous along the periphery of the respective duct so as to form spaced-apart first-leg-only regions.

18. The clamp assembly of claim 17, wherein the first and second ducts have a plurality of spaced-apart straight sides and wherein the first-leg-only regions correspond to regions of the respective duct between the spaced-apart straight sides.

19. A damper access assembly for use in a ventilation duct system including ductwork and a damper enclosure configured to enclose a damper and having an inlet and an outlet operatively coupled to the ductwork, the damper access assembly comprising:
 an adapter defining a passage therethrough and having a first end and a second end, the first end being configured to be operatively coupled to one of the inlet or outlet of the damper enclosure and the second end including a first radially outwardly directed flange including a leg extending at a transverse angle therefrom; and
 a damper access duct section defining a passage therethrough and having a first end and a second end, each of the first end and the second end of the damper access duct section including a second radially outwardly directed flange at the respective first end and second end thereof, each of the second flanges including a leg extending at a transverse angle therefrom, the first and one of the second flanges being configured to form a generally T-shaped joint between the adapter and the damper access duct section; and
 a circumferential clamp member including a base portion that defines an annular periphery of the clamp member and including first lateral portions and second lateral portions that each extend inwardly from the base portion, the first lateral portions being generally parallel to the second lateral portions to define a channel therebetween for receiving the generally T-shaped joint to releasably couple the damper access duct section to the adapter, the first lateral portions and the second lateral portions including longitudinal extensions that extend away from the channel to increase rigidity of the joint,
 wherein the circumferential clamp member is configured to operatively and releasably couple the damper access duct section to the adapter at the T-shaped joint so that the damper access duct section is removable relative to the damper enclosure and the ductwork to permit access to the damper when the damper access duct section is removed.

20. The damper access assembly of claim 19 further comprising:
 a faceplate configured to be secured to the ductwork, the faceplate including a first leg configured to be secured to the ductwork and a second leg oriented at a transverse angle with respect to the first leg, the second leg of the faceplate and the second leg of the duct section being configured to form a generally T-shaped joint between the ductwork and the damper access duct section.

21. The damper access assembly of claim 20, further comprising:
 a second circumferential clamp member including a base portion that defines an annular periphery of the clamp member and including first lateral portions and second lateral portions that each extend inwardly from the base portion, the first lateral portions being generally parallel to the second lateral portions to define a channel therebetween for receiving the generally T-shaped joint formed by the faceplate and the second flange on the damper access duct section to releasably couple the damper access duct section to the ductwork, and the first lateral portions and the second lateral portions including longitudinal extensions that extend away from the channel to increase rigidity of the joint.

22. A damper access assembly for use in a ventilation duct system including ductwork and a damper enclosure configured to enclose a damper and having an inlet and an outlet operatively coupled to the ductwork, the damper access assembly comprising:
- an adapter defining a passage therethrough and having a first end and a second end, the first end being configured to be operatively coupled to one of the inlet or outlet of the damper enclosure and the second end including a first radially outwardly directed flange including a leg extending at a transverse angle therefrom; and
- a damper access duct section defining a passage therethrough and having a first end and a second end, each of the first end and the second end of the damper access duct section including a second radially outwardly directed flange at the respective first end and second end thereof, each of the second flanges including a leg extending at a transverse angle therefrom, the first and one of the second flanges being configured to form a generally T-shaped joint between the adapter and the damper access duct section; and
- a circumferential clamp member including a first member, a second member, and a hinge operatively coupling the first member to the second member, the first member being moveable relative to the second member by the hinge between an opened position in which the clamp member is installable onto the first and second flanges and a closed position in which the annular clamp member engages each of the first and second flanges to releasably couple the access duct section to the adapter, each of the first and second members including a base portion defining an annular periphery of the clamp member and a first lateral portion and a second lateral portion each extending inwardly from the base portion, the first lateral portion being generally parallel to the second lateral portion to define a channel therebetween for receiving the generally T-shaped joint, and the first lateral portions and the second lateral portions including longitudinal extensions that extend away from the channel to increase rigidity of the joint, wherein the circumferential clamp member is configured to operatively and releasably couple the damper access duct section to the adapter at the T-shaped joint so that the damper access duct section is removable relative to the damper enclosure and the ductwork to permit access to the damper when the damper access duct section is removed.

23. The damper access assembly of claim 22 further comprising:
- a faceplate configured to be secured to the ductwork, the faceplate including a first leg and a second leg oriented at a transverse angle with respect to the first leg, the first and second faceplates being configured to form a generally T-shaped joint between the ductwork and the damper access duct section.

24. The damper access assembly of claim 23, further comprising:
- a second circumferential clamp member including a first member, a second member and a hinge operatively coupling the first member to the second member, each of the first and second members including a base portion defining an annular periphery of the clamp member and a first lateral portion and a second lateral portion each extending inwardly from the base portion, the first lateral portion being generally parallel to the second lateral portion to define a channel therebetween for receiving the generally T-shaped joint, the first lateral portions and the second lateral portions including longitudinal extensions that extend away from the channel to increase rigidity of the joint, and the first member being moveable relative to the second member by the hinge between an opened position in which the clamp member is installable onto the generally T-shaped joint and a closed position in which the annular clamp member engages the generally T-shaped joint to releasably couple the access duct section to the ductwork.

* * * * *